Oct. 29, 1957 C. P. BACCARI 2,811,308

ELECTRONIC CALCULATOR

Filed July 12, 1954 12 Sheets-Sheet 1

INVENTOR.
CHESTER P. BACCARI

BY Murray Nanes
ATTORNEY

INVENTOR.
CHESTER P. BACCARI
BY
Murray Nanes
ATTORNEY

Oct. 29, 1957 C. P. BACCARI 2,811,308

ELECTRONIC CALCULATOR

Filed July 12, 1954 12 Sheets-Sheet 3

INVENTOR.
CHESTER P. BACCARI

BY Murray Nanes

ATTORNEY

INVENTOR.
CHESTER P. BACCARI
BY Murray Nanes
ATTORNEY

Oct. 29, 1957 C. P. BACCARI 2,811,308

ELECTRONIC CALCULATOR

Filed July 12, 1954 12 Sheets-Sheet 5

INVENTOR.
CHESTER P. BACCARI

BY Murray Nanes

ATTORNEY

Oct. 29, 1957 C. P. BACCARI 2,811,308

ELECTRONIC CALCULATOR

Filed July 12, 1954 12 Sheets-Sheet 6

INVENTOR.
CHESTER P. BACCARI

BY

Murray Nanes

ATTORNEY

Oct. 29, 1957 C. P. BACCARI 2,811,308

ELECTRONIC CALCULATOR

Filed July 12, 1954 12 Sheets-Sheet 8

INVENTOR.
CHESTER P. BACCARI

BY Murray Nanes

ATTORNEY

Oct. 29, 1957 C. P. BACCARI 2,811,308

ELECTRONIC CALCULATOR

Filed July 12, 1954 12 Sheets-Sheet 9

*INVENTOR.*
CHESTER P. BACCARI

*BY* Murray Nanes

ATTORNEY

*INVENTOR.*
CHESTER P. BACCARI
*BY* Murray Nanes
ATTORNEY

*INVENTOR.*
CHESTER P. BACCARI

*BY* Murray Nanes

ATTORNEY

INVENTOR.
CHESTER P. BACCARI
BY
Murray Nanis
ATTORNEY 2,811,308

ELECTRONIC CALCULATOR

Chester P. Baccari, Poughkeepsie, N. Y., assignor to International Business Machines Corporation, New York, N. Y., a corporation of New York Application July 12, 1954, Serial No. 442,698

17 Claims. (Cl. 235—61.6)

This invention relates to an improvement in record controlled calculating machines, and more particularly to means for increasing the calculate-time of fixed calculate-time calculators.

In the commercial computing machine known as the "IBM 604" electronic calculator, shown in the patent to R. L. Palmer et al., No. 2,658,681, record cards are fed through a reading station in one cycle and through a punch station in the next cycle, factors to be used in the calculation being read into the electronic calculator at the reading station, the calculation being performed during the time the record card moves between the reading station and the punch station, and then results being punched into the same record card as it passes through the punch station. In this calculator, since the cards are fed at a fixed rate and since calculate-time is a fixed portion of the card feed cycle, the time for calculation is a fixed time. If a problem on a record card cannot be completed in the fixed calculate-time, an unfinished program test will so indicate, and the machine either stops or signals an error.

In another commercial machine, known as the "IBM 605" card programmed calculator, shown in the patent to J. E. Dayger et al., No 2,615,629, factors are read into an electronic calculator unit from cards in the card feed of an electric accounting machine unit and computed results can be punched in a third unit, known as a summary punch. This machine, too, has a fixed calculate-time, and after each calculate period ends, an unfinished program test is made, at which time, if the calculation is not finished, means are provided to prevent the feeding of the next card and to restart the calculation at the point left off, thereby providing a calculation time which lasts all during the next cycle.

This latter means of increasing the calculate-time has the major disadvantage that it adds at least one complete cycle where the original calculation time is not long enough to solve the problem. This is especially disadvantageous where all the problems in a set of cards are long, at which time, the machine speed may decrease from 100 cards per minute to as little as 50 or less cards per minute.

It is an object of the present invention to insert novel means into the "IBM 604" type calculator so as to increase its fixed calculate-time when required without materially decreasing the overall speed of operation of the entire machine.

Another object is to provide means for increasing the calculate-time of a calculator without adding a complete cycle to the machine operation.

Still another object is to provide, in a calculator, a clutch which instead of delaying the machine one or more full machine cycles, will delay the machine in units which are fractions only of a machine cycle.

A further object of the invention is to provide in a calculator, means for testing an unfinished program during instead of at the end of calculate-time.

A still further object is to provide means for increasing the calculate-time of a calculator without stopping the calculation to make an unfinished program test.

Another object is to provide, in a calculator, clutch means which can stop machine functions to provide increased calculate-time and rapidly start the machine functions when required.

Still another object is to provide, in a calculator, a means for increasing calculate-time in units which are fractions of a machine cycle comprising a clutch which includes a pawl co-operating with a rotating disc that has a number of notches representative of the number of index points in the machine cycle.

A further object is to provide, in a calculator, means for testing an unfinished program including cam means which continuously rotate to provide periodic testing even when other machine functions have stopped.

A still further object is to provide, in a calculator, the maximum amount of calculate-time before permitting the results of the unfinished program test to delay machine functions and increase calculate-time.

Other objects of the invention will be pointed out in the following description and claims and illustrated in the accompanying drawings, which disclose by way of example, the principle of the invention and the best mode which has been contemplated of applying that principle.

Figure 9A:
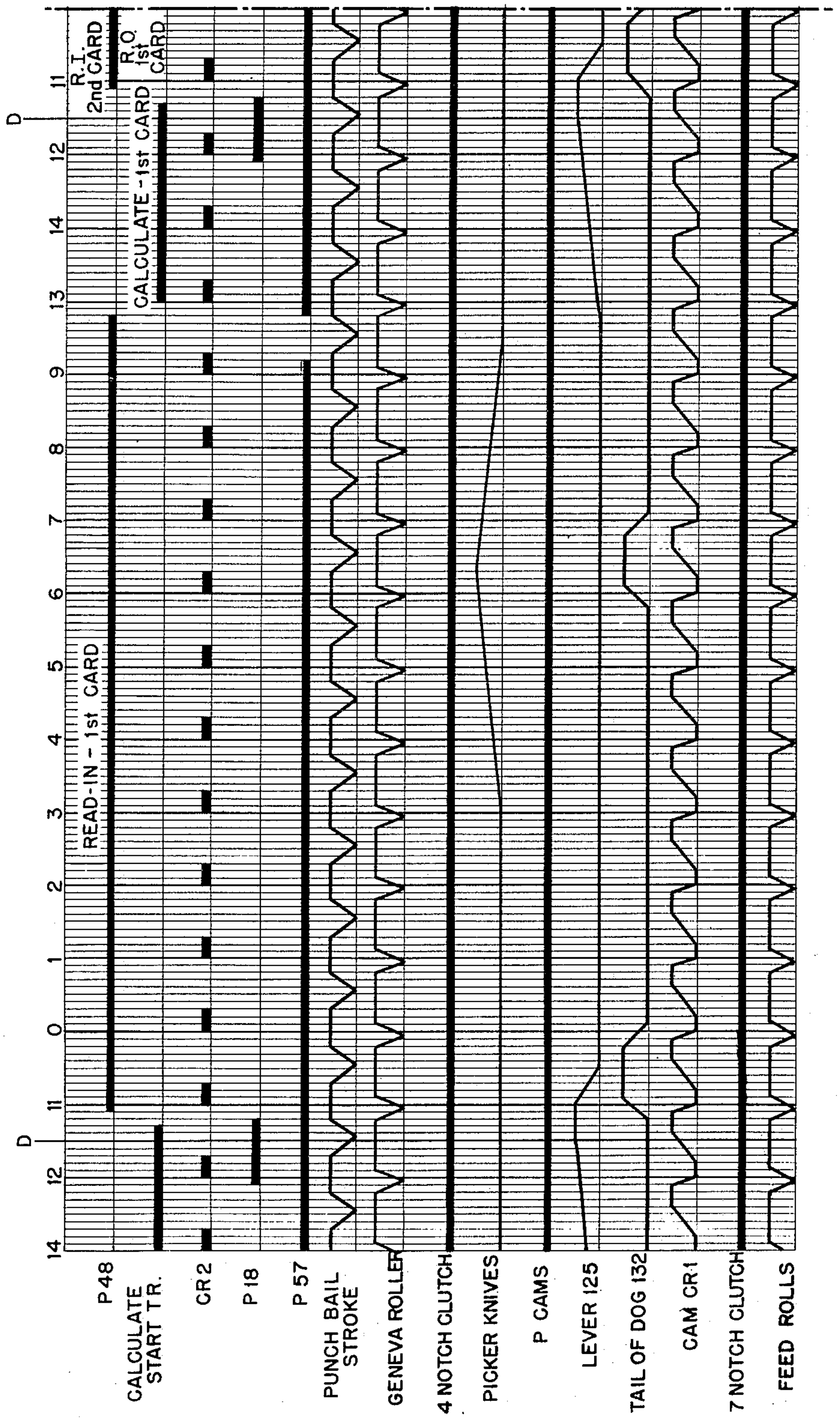
Figure 9B:
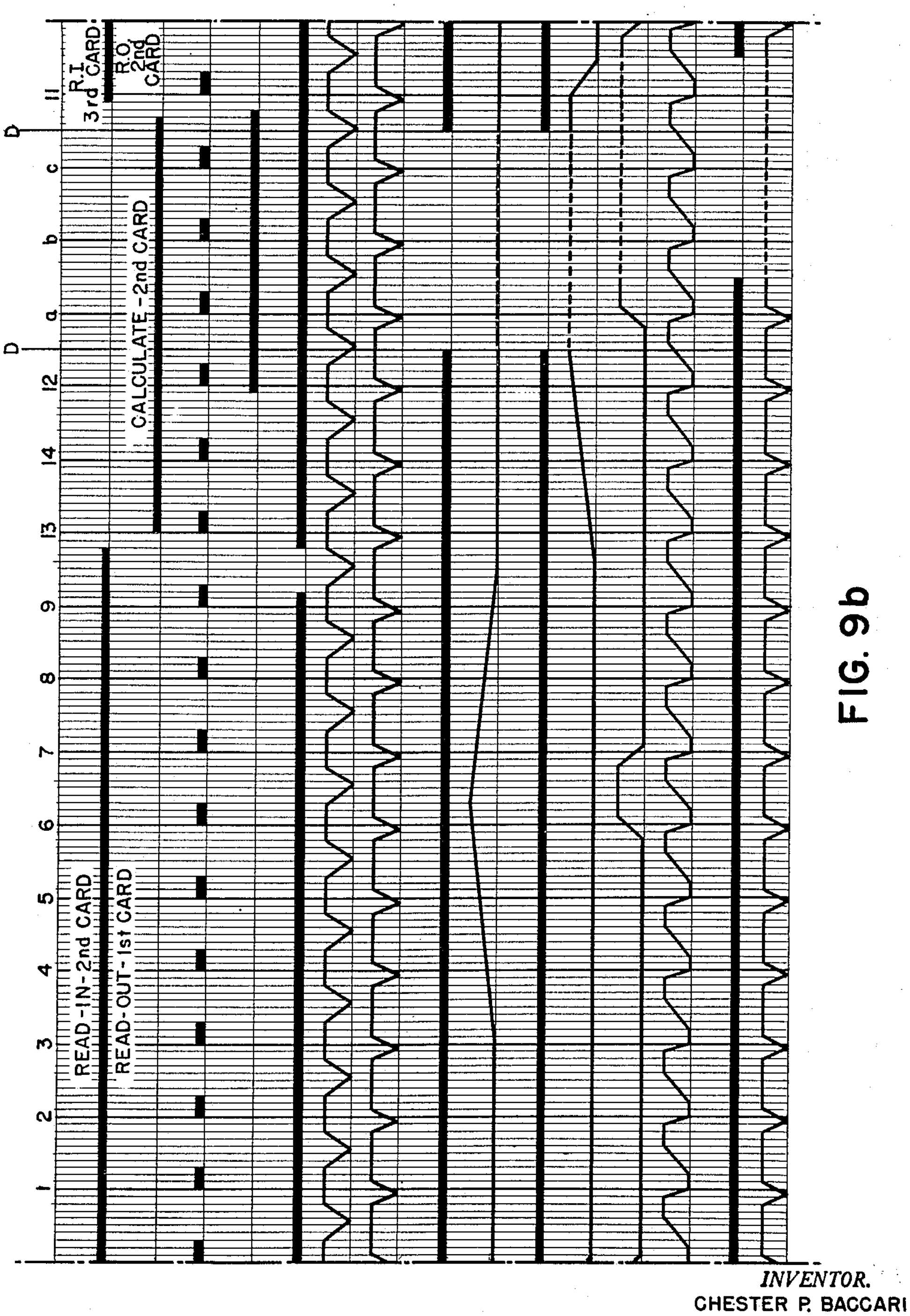
Figure 9C:
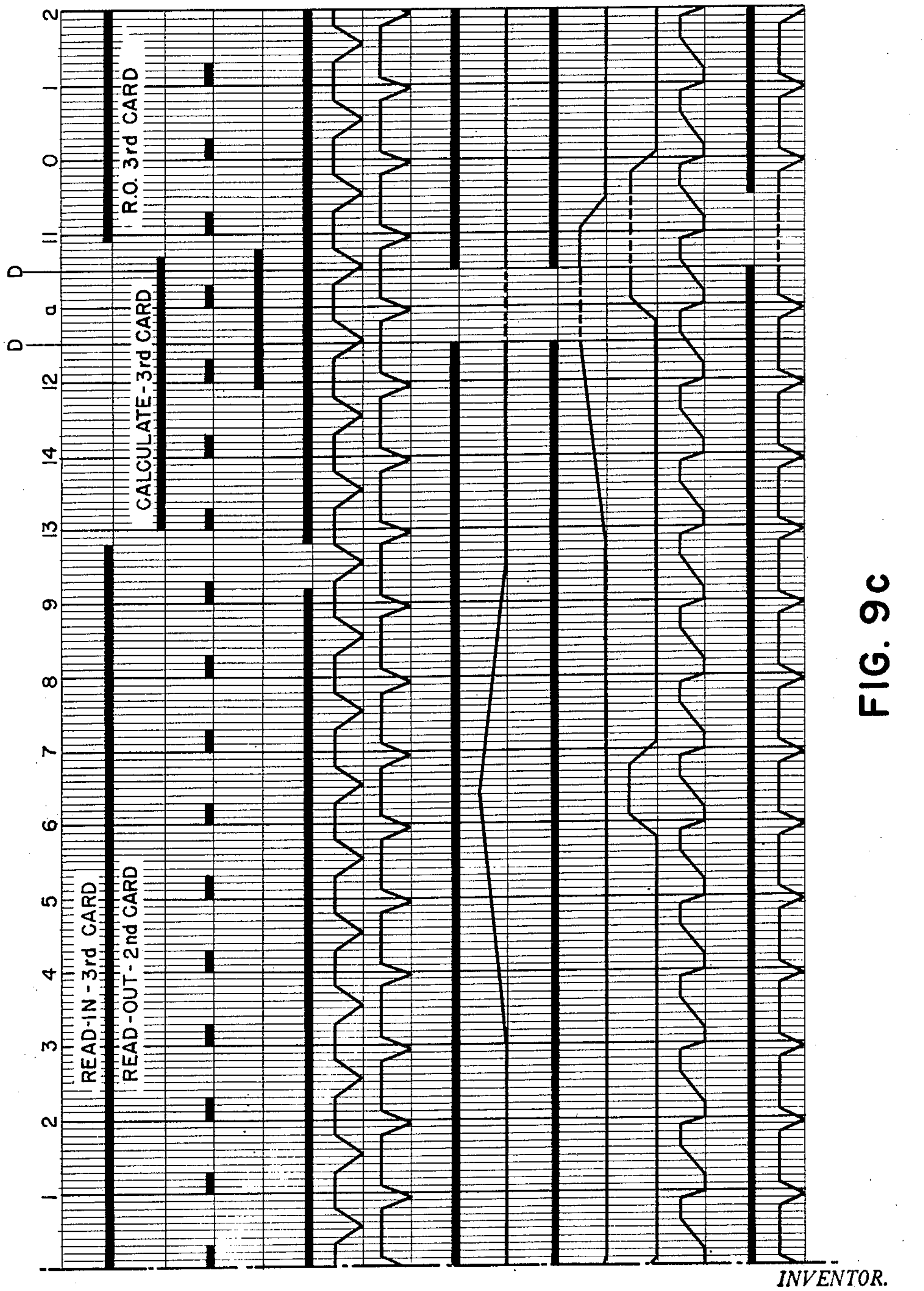

Figs. 9*a*, 9*b* and 9*c* are timing charts, which when aligned end to end, from left to right in that order, are representative of three cycles of operation of the calculating machine.

Figure 8:
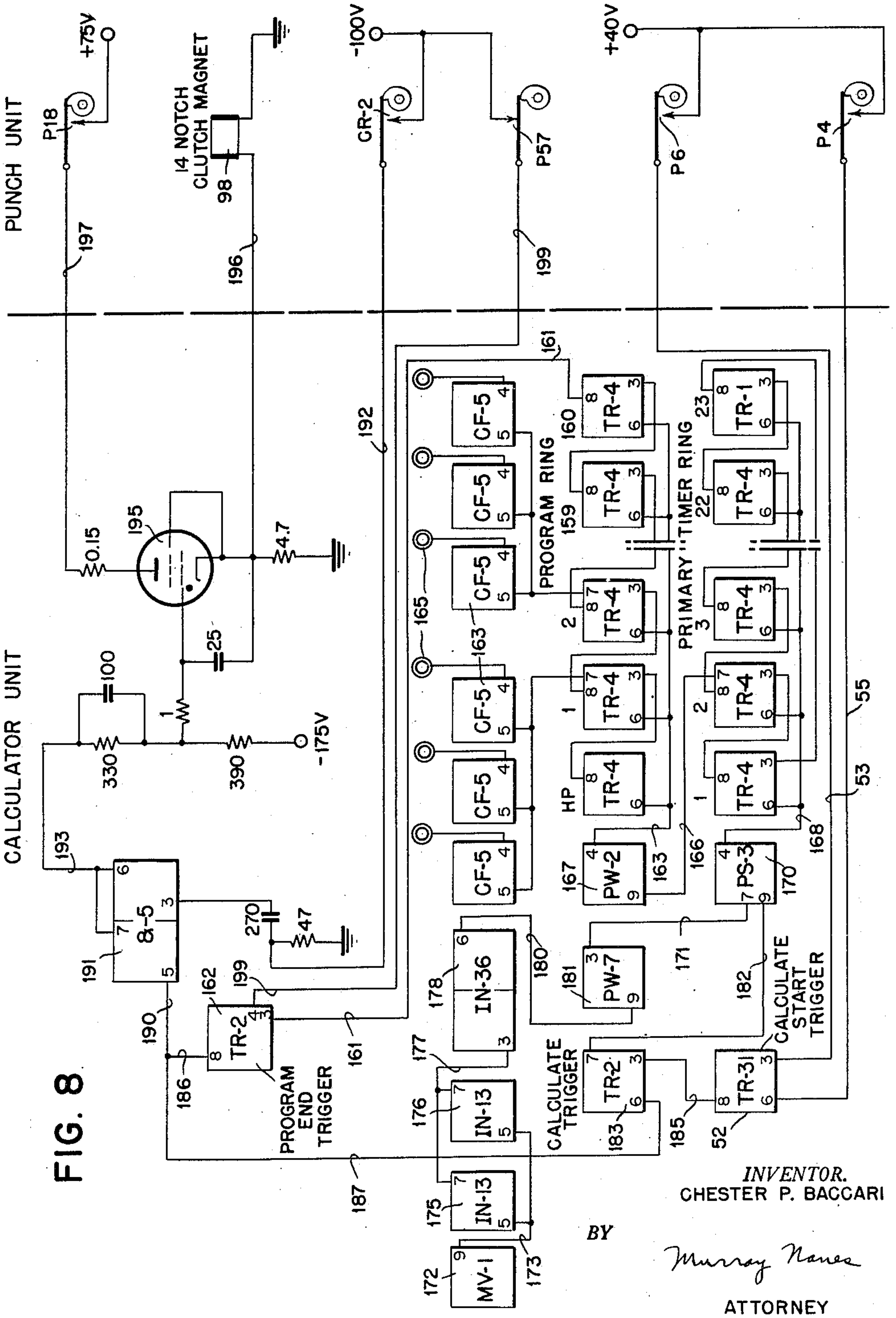
Fig. 8 is a wiring diagram showing a portion of the punch and calculator units embodying the preferred form of the invention.
Figure 10:
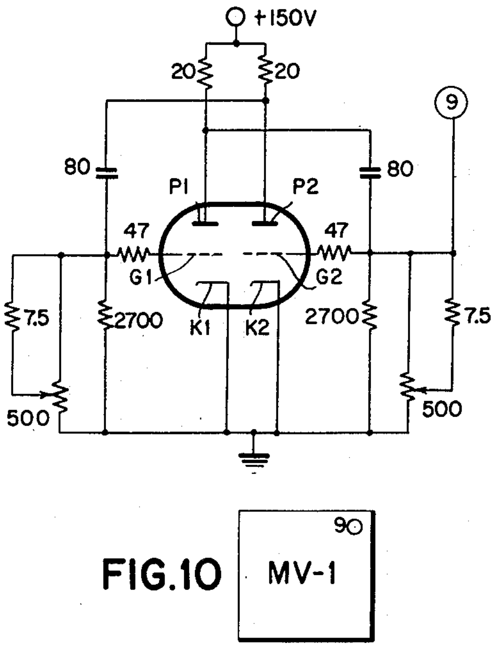

Fig. 10 is a detailed circuit diagram of a multivibrator and its corresponding block representation as employed in Fig. 8.

Figure 11:
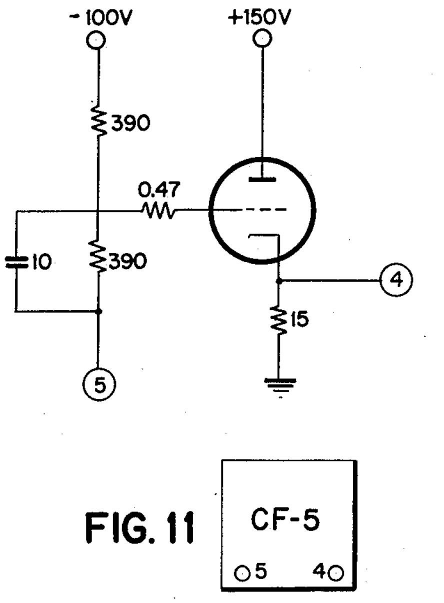

Fig. 11 is a detailed circuit diagram of a cathode follower and its corresponding block representation as employed in Fig. 8.

Figure 12:
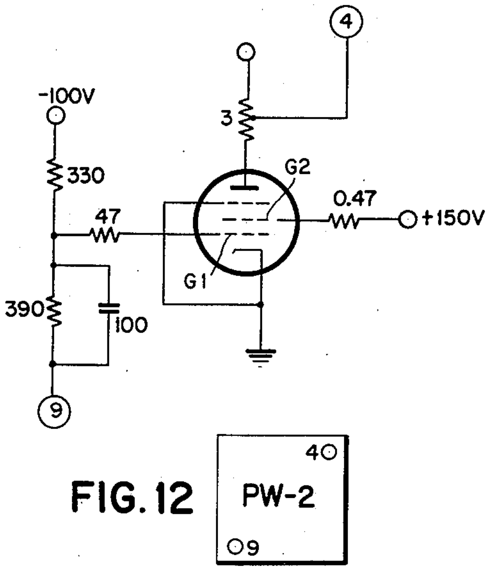
Figure 13:
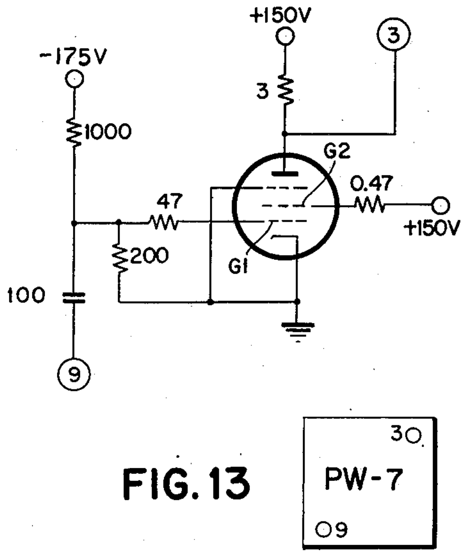
Figure 14:
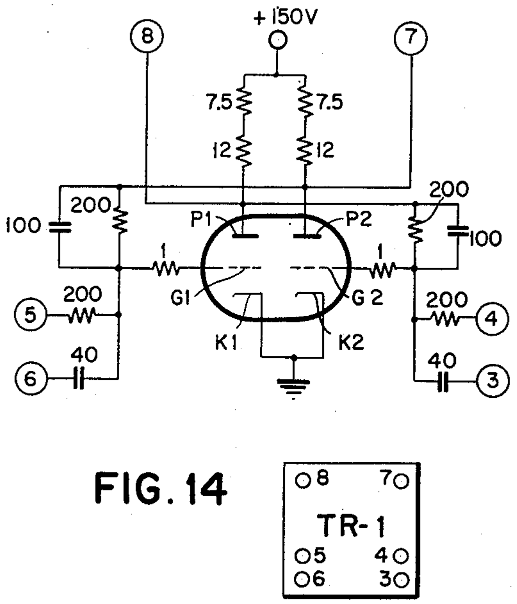

Figs. 12 and 13 are detailed circuit diagrams and the respective block representations of power tubes as employed in Fig. 8.

Figs. 14, 15, 16 and 17 are detailed circuit diagrams and the respective block representations of electronic triggers as employed in Fig. 8.

Figure 18:
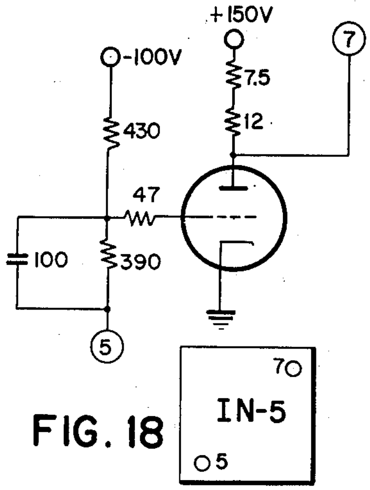
Figure 19:
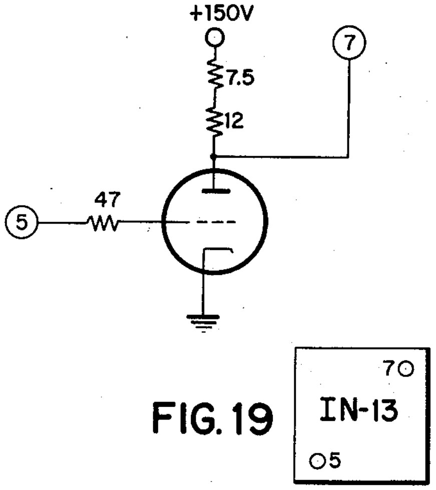
Figure 20:
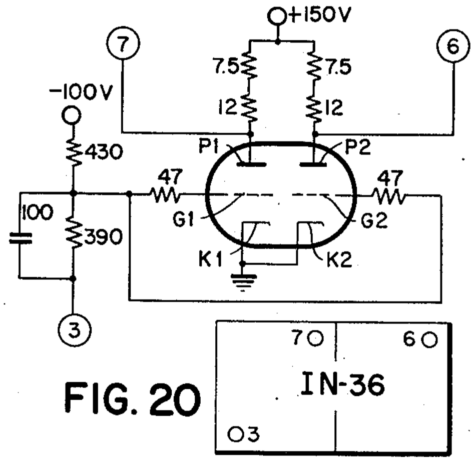

Figs. 18, 19 and 20 are detailed circuit diagrams and the respective block representations of inverter circuits as employed in Fig. 8.

Figure 21:
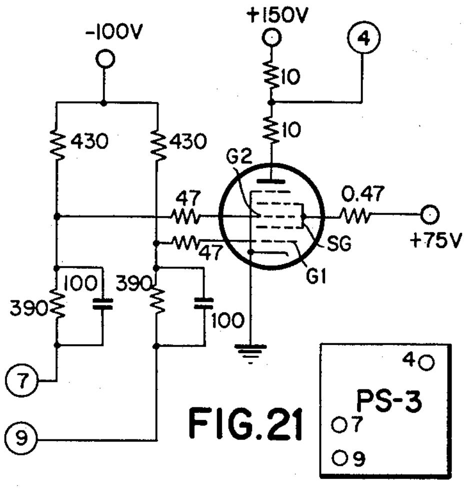

Fig. 21 is a detailed circuit diagram of an electronic pentagrid switch circuit and its corresponding block representation as employed in Fig. 8.

Figure 22:
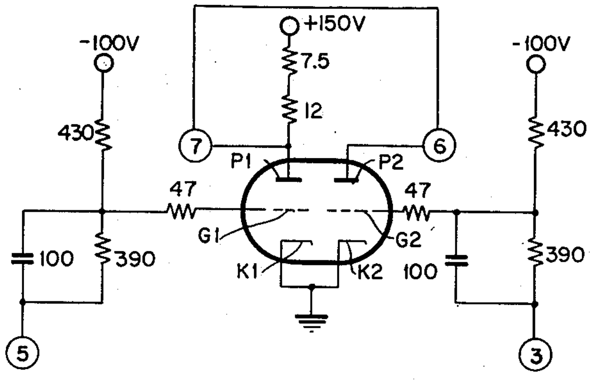
Figure 22:
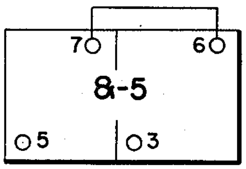

Fig. 22 is a detailed circuit diagram of an "And" circuit and its corresponding block representation as employed in Fig. 8.

Wherever shown, unless otherwise indicated in the drawings, the values for the various resistors and condensers are in thousands of ohms and micro-microfarads, respectively. For example, a resistor labeled 200 indicates a 200K (200,000) ohm resistor, a condenser labeled 100 indicates a 100 micro-microfarad condenser.

The terms "positive" and "negative" potentials used in the discussion of the circuits refer to relative values, rather than values with respect to ground.

Referring to Fig. 8 of the drawings, it will be seen that the different elements comprising the invention are represented by blocks, whose contents are illustrated in other figures of the drawings, the inputs and outputs only being indicated in Fig. 8. Before proceeding with a description of the means for extending calculate-time, a detailed description of the respective elements such as the multivibrator, cathode follower, power tubes, triggers, inverters, pentagrid switch, and "And" circuit will be given. The contents of the respective blocks and the respective block representations are shown in Figs. 10 to 22.

*Multivibrator*

In Fig. 10, there is shown a type of multivibrator, whose block symbol is labeled MV–1. This multivibrator comprises, for example, a type 6J6 dual triode tube containing two triodes in one envelope. Two such triodes with normally conducting grids, when retroactively capacitively coupled will oscillate in a manner now well known in the art. This device is called a multivibrator and in the present invention is used as the parent source of square pulses supplied to the pulse generator of the read-in circuit.

Referring to Fig. 10, plate P1 of the left hand triode is coupled via an 80 micro-microfarad condenser, in series with a 47K ohm resistor to a grid G2 of the right hand triode. Connected between ground and the junction of this resistor are a 500K ohm potentiometer in parallel with a 2700K ohm resistor. A 7.5K ohm resistor is connected between the same junction and a tap on the 500K ohm potentiometer. Plate P1 of the left hand triode is connected via the 20K ohm resistor to a +150 volt source, while P2 of the right hand triode is connected to the same +150 volt source through another 20K ohm resistor.

Cathodes K1 and K2 are commonly connected to ground.

Plate P2 is coupled to the grid G1 by an 80 micro-microfarad condenser in series with a 47K ohm resistor. Connected in between ground and the junction of this condenser and resistor are a 500K ohm potentiometer in parallel with a 2700K ohm resistor. A 7.5K ohm resistor is connected between this latter junction and a tap on a 500K ohm potentiometer. The frequency of the multivibrator can be set by varying the taps on two 500K ohm potentiometers and the square wave output is taken from out terminal "9" which is connected as shown.

*Cathode follower*

Referring to Fig. 11, there is illustrated therein, a type of cathode follower whose block symbol is labeled CF–6. The cathode follower used in the invention comprises a single triode which may actually be one of the triodes only, of a dual triode 12AV7 type tube. A cathode follower may be defined as a vacuum tube circuit in which the input signal is applied between the control grid and ground, but the output, instead of being taken from the plate, is taken from between the cathode and the cathode load circuit which may comprise its own resistor or a resistor in another circuit, for example. The cathode follower has a high input impedance, but a low output impedance and is capable of producing a power gain, without a voltage inversion.

The grids of cathode follower CF–5 (Fig. 7) is connected through a 0.47K ohm resistor, in series with a 390K resistor, to a negative bias supply of −100 volts and is also connected through the same 0.47K resistor, in series with another 390K resistor, shunted by a 10 micro-microfarad condenser, to an input terminal "5." The plate is directly connected to a +150 volt power supply and the cathode is connected via a 15K ohm cathode load resistor to ground. An output terminal "4" is directly connected to the cathode.

*Power tubes*

Referring to Figs. 12 and 13, power tube circuits are illustrated therein, designated as PW–2 and PW–7 respectively. A power tube is one which is capable of producing a power gain from an input signal with, however, a voltage inversion. The circuit shown in Figs. 12 and 13 include a pentode, which may be of the 6AQ5 type, with a grounded cathode, and a suppressor grid directly connected to the cathode. The grid G2 is connected through a 0.47K resistor, to a source of +150 volts. The plate is connected to a +150 volt power supply, through a 3K ohm resistor.

Power tube PW–2 (Fig. 12) has an output terminal "4" connected to a tap on said 3K ohm resistor. The grid G1 is connected through a 47K resistor, in series with a 330K resistor, to a −100 volt negative bias supply. Grid G1 is coupled, through the same 47K resistor, in series with a 390K ohm resistor, shunted by a 100 micro-microfarad condenser, to an input terminal "9."

Grid G1 of power tube PW–7 (Fig. 13) is connected through a 47K ohm resistor, in series with a 100 micro-microfarad condenser, to an input terminal "9." Grid G1 received its negative bias through the same 47K resistor connected to a divider network comprising a 200K resistor connected to ground, as shown and a 1000K resistor connected to a source of −175 volts. An output terminal "3" is connected directly to the plate.

*Triggers*

Referring to Figs. 14 to 17, inclusive, the details of several electronic triggers are shown, designated respectively, TR–1, TR–2, TR–4 and TR–31, which are commonly known in the art as the Eccles-Jordan type trigger. These each comprise two cross-coupled triodes (which may be included in one envelope, such as, for example, a type 6J6 tube) in which a plate P1, of a left hand triode, is coupled by means of a 200K resistor in series with a 1K resistor, to the grid G2 of a right hand triode, and plate P2 of a right hand triode is likewise coupled to the grid G1 of the left hand triode by a 200K ohm resistor in series with a 1K ohm resistor, each of these 200K ohm resistors being shunted by a 100 micro-microfarad condenser, as shown. Plates P1 and P2 of all the triggers are similarly connected to a +150 volt power supply via pairs of 12K and 7.5K ohm resistors in series, as shown. The cathodes K1 and K2 of all the triggers are grounded, as shown.

In triggers TR–1, TR–2 and TR–4, grid G1 is connected via the 1K ohm resistor in series with another 200K ohm resistor, to a terminal "5," and is coupled through the same 1K ohm resistor in series with a 40 micro-microfarad condenser, to an input terminal "6." Grid G2 is connected by identical circuitry to a terminal "4" and to an input terminal "3."

Trigger TR–2 has a 10 micro-microfarad condenser connected between the input circuits, as shown, in order to obtain more stabilized operation; the condenser tending to prevent operation by transient pulses.

In all other respects, the triggers TR–1, TR–2 and TR–4 differ from each other only in the specific connections of the output terminals.

In triggers TR–1 and TR–2 (Figs. 14 and 15, respectively), an output terminal "3" is directly connected to plate P1 while an output terminal "7" is directly connected to plate P2, as shown.

In trigger TR–4 (Fig. 16) a terminal "7" is directly connected to plate P2 and a terminal "8" is connected to the tap between the 7.5K ohm resistor and the 12K ohm resistor of plate P2.

Trigger TR–31 (Fig. 17) is similar to TR–4 except for details which will now be pointed out. The input terminal "6" of TR–32 is connected via an 82K ohm resistor to one side of the 1K ohm resistor whose other side is connected to grid G1. A 40 micro-microfarad condenser is connected from the junction of the 1K and 82K ohm resistors to ground. Input terminal "3" of TR–31 is connected by identical connections to the grid G2. The only other difference between triggers TR–31 and TR–4 is that TR–31 has a 10 micro-microfarad condenser connected between the input circuits, as shown, in order to obtain more stabilized operation, the condenser tending to prevent operation by transient pulses.

As is now well-known in the art, the triggers described have two conditions of stability. When the left hand triode of the trigger is conducting, the voltage at plate P1, with the circuit values indicated, is lowered from approximately +140 to approximately +40 volts, which, through the coupling previously described, maintains the grids G2 relatively negative, so that the right hand triode is blocked when the left hand triode conducts. Thus, if the left hand triode is conducting, then plate P1 and its corresponding output are negative and plate P2 and its corresponding output are positive. This comprises one state of stability of the trigger and will hereinafter be designated as the On condition. In a similar manner, if the right hand triode is conducting, the reduction in voltage on plate P2 is applied by the coupling connection, previously described, to the grid G1, to thus block the left hand triode so that P1 and its corresponding left hand output now becomes positive and this condition will hereinafter be designated as the Off condition.

If, for example, the right hand triode is conducting, (trigger Off) a sharp negative pulse applied to its grid G2 via input terminal "3," will flip the trigger On by blocking the right hand triode and thus rendering the left hand side conductive. Likewise, if the left hand triode is conducting (trigger On), a sharp negative pulse applied to its grid G1 via input terminal "6" blocks the left hand side of the tube, thus flipping the trigger Off. The above two methods are normally used for flipping the triggers On and Off.

In the operation of the invention, it is required that some of the triggers be reset On and others reset Off before the start of an operation. To reset a trigger On, a sufficient positive voltage is applied to grid G1 to cause the left hand side of a 6J6 tube to conduct. The triggers are so designed that a positive shift applied to either input terminals "6" or to terminal "3" and through the 40 micro-microfarad condenser to the grid will not flip the triggers. However, by applying a positive voltage conductively through terminal "5" or "4" of any of the triggers shown and through the corresponding resistors to one of the grids, the trigger will be flipped. In triggers which are to be reset On, terminal "4" is connected to a −100 volt negative bias supply and terminal "5" is connected to a −100 volt reset line in a manner to be presently described. The −100 volt reset line is then shifted from −100 volts to ground potential (relatively plus) when it is desired to reset the trigger, ground potential being sufficiently positive to thus reset the trigger On by rendering the left hand triode conducting.

In triggers which are to be reset Off, it is the terminal "4" which is connected to the −100 volt reset line while terminal "5" is connected to the −100 volt negative bias supply so that when the −100 volt reset line is shifted to ground potential, the right hand triode is rendered conducting, thus resetting the trigger Off.

Trigger TR–31 is a trigger especially designed to operate by means of positive cam pulses and, thus, if a positive pulse is applied to terminal "6," trigger TR–31 will turn On, and, likewise, if a positive pulse is applied to terminal "3," trigger TR–31 will turn Off.

*Inverters*

Inverter circuits, designated IN–5, IN–13, and IN–36, respectively, are illustrated respectively, in Figs. 18 through 20. The function of an inverter is to take a positive voltage supplied to its input terminal and produce a negative voltage at its output terminal. Conversely, negative inputs produce positive outputs.

Each inverter employed may comprise, for example, one half of a dual triode type 6J6 tube, except that the inverter IN–36 (Fig. 20) employs both halves of the dual triode illustrated. The cathodes of all the inverters are connected to ground, as shown.

In inverter IN–5 (Fig. 18) the grid is coupled via a 47K ohm resistor and a 430K ohm resistor to a source of −100 volts and is also connected to an input terminal "5" through the same 47K resistor, in series with a 390K ohm resistor, shunted by a 100 micro-microfarad condenser as shown. The plate is connected to a +150 volt power supply through a 12K and a 7.5K ohm resistor, in series, and the output terminal "7" is connected directly to the plate.

In inverter IN–13 (Fig. 19), the grid is connected via a 47K ohm resistor to an input terminal "5" and the plate is connected to a +150 volt power supply through a 12K and a 7.5K ohm resistor, in series, and the output terminal "7" connected directly to the plate.

In inverter IN–36 (Fig. 20), a −100 volt source is applied to one end of a 430K ohm resistor whose other end is connected via a 390K ohm resistor shunted by a 100 micro-microfarad condenser to a terminal "3." The junction of the 430K ohm resistor and the 390K ohm resistor is connected, via one 47K ohm resistor, to the grid G1 and via another 47K ohm resistor, to the grid G2. Plate P1 of the left hand triode is connected directly to an output terminal "7" and is also connected via a 12K ohm and a 7.5K ohm resistor, in series, to a +150 volt supply, while plate P2 of the right hand triode is connected directly to an output terminal "6" and is also connected, via a 12K ohm and a 7.5K ohm resistor, in series, to the +150 volt supply.

*Pentagrid switches*

Fig. 21 illustrates a pentagrid switch and its block PS–3, which may employ a pentagrid tube of the 6BE6 type.

Switching circuits which are, in fact, gating means, require simultaneously applied positive voltages at the respective input terminals connected to their grids G1 and G2, in order to cause conduction of the respective tube, so that a negative output is produced when and only when both inputs are positive. When a positive voltage is applied to one of the grids of a pentagrid switch, the voltage is said to condition the switch (or that grid). Thus, the switch (or the grid) has then been conditioned to permit conduction when the other grid goes positive. If a grid of a switch is conditioned and positive pulses are applied to the other grid, the pulses will pass through the switch and are transformed to a like number of negative pulses.

The grid G1 of pentagrid switch PS–3 (Fig. 21) is shown as connected by means of a 47K ohm resistor in series with a 430K ohm resistor, to a voltage source of −100 volts as also connected through the same 47K ohm resistor, in series with a 390K ohm resistor, shunted by a 100 micro-microfarad condenser, to an input terminal "9." Grid G2 is connected through a 47K ohm resistor in series with said 430K ohm resistor to said source of −100 volts and is also connected through the same 47K ohm resistor, in series with said 390K ohm resistor shunted by a 100 micro-microfarad condenser, to an input terminal "7." The plate of switch PS–3 is connected through two 10K ohm resistors, in series, to a +150 volt supply. An output terminal "4" is connected to the junction of the two 10K ohm resistors. The cathode of switch PS–3 is grounded, as shown, and the suppressor grid is directly connected to the cathode, The screen grid SG is connected via a 0.47K ohm resistor to a source of +75 volts.

*"And" circuit*

When the plates of two inverters, which are negatively biased beyond cutoff, have a common plate resistor, the combined circuit, by using two separate inputs can be an "And" circuit as shown in Fig. 22. The value of the plate resistors are chosen so that the inverter tubes are operated on the portion of their characteristic curve where most of the voltage drop is across the load resistor and where changes in voltage at the plate are very slight, with a change in plate current. This means that the voltage at the commonly connected plates of Fig. 22 are essentially the same, and negative, whether one inverter tube is conducting or both are conducting. Only when neither inverter is conducting do the commonly connected plates go positive.

A so-called negative "And" circuit makes use of this effect by keeping the two inverters normally conducting and applying constant positive voltages to the two inputs. Then in order to get a positive output, both inputs must go negative.

Basically, an "And" circuit acts like a pentagrid switch, in that it requires a coincidence of two inputs to obtain one output. The negative "And" circuit differs from the pentagrid switch, in that it acts to produce a positive output signal, only upon coincidence of two negative inputs, while the pentagrid switch acts, as previously described, to effect a negative output signal, only upon a coincidence of two positive inputs.

The "And" circuit disclosed in Fig. 22 has its block insignia labeled "&–5" and comprises the two triodes of a dual triode 6K6 type tube. The left hand triode comprises a type IN–5 inverter (Fig. 18). The right hand triode is similar to a type IN–5 inverter except that its input terminal is labeled "3" and its output terminal "6" and it has no plate resistors. Output terminal "7" (Fig. 22) is conductively connected to output terminal "6" as shown and the circuit then has a common plate resistor and functions as an "And" circuit.

While specific tube types and values of resistors and condensers have been defined in connection with the multivibrator, power tubes, triggers, inverters and switches, these are to be taken as exemplary only and the tube type and values may be varied in accordance with the knowledge of those skilled in the art, without departing from the spirit of the invention.

*Electronic calculator*

A calculator which utilizes the subject invention as a part thereof is the one fully described in the patent of R. L. Palmer et al., No. 2,658,681, with certain obvious changes necessary for direct incorporation of this invention into the calculator, as will be described hereinafter. In said Palmer et al. patent, there is disclosed a combination of machines for carrying out complex calculations, consisting of an electronic calculator unit and a summary punch unit, known together as the "IBM 604." The main purpose of the machines is to perform a similar series of calculations from the factors punched in each of a group of successively fed record cards, with the various steps of each calculation under control of manually plugged wiring.

Figure 6:
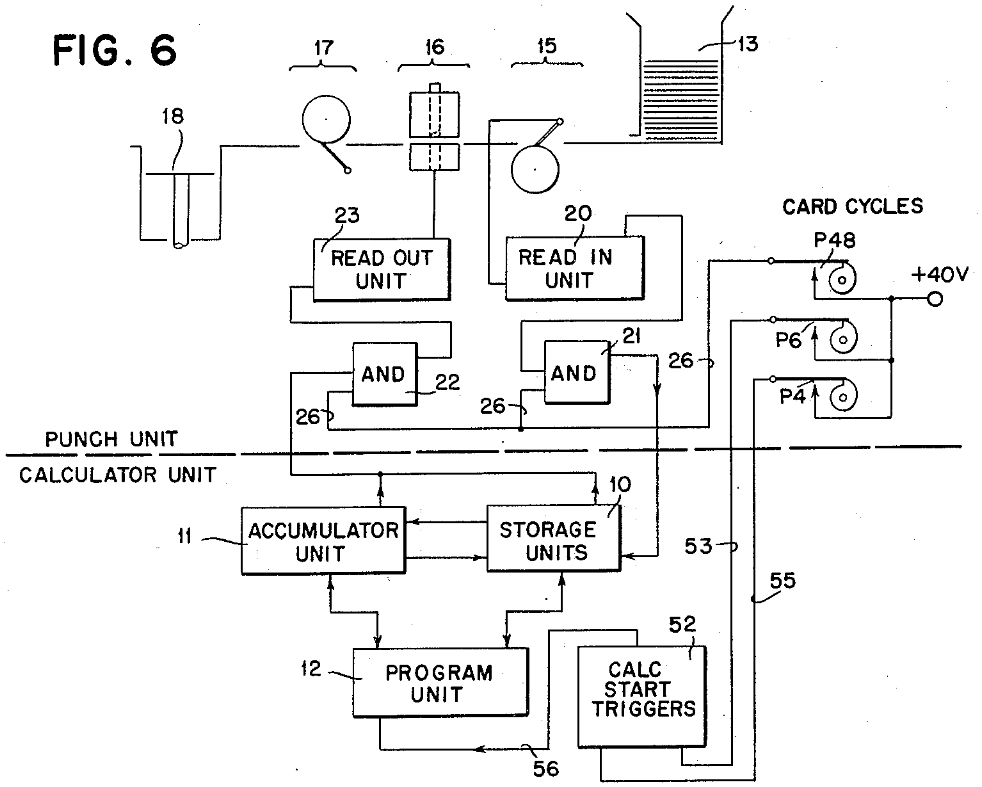
Fig. 6 is a schematic flow diagram of the punch and calculator units comprising the calculating machine.

Before proceeding to the description of the invention itself, it is believed that a description of the flow diagram of Fig. 6, which shows the calculator and punch units broken down into their major blocks, will permit a better understanding of how the subject invention operates. The calculator unit includes as certain elements thereof, electronic storage units 10, an electronic accumulator 11, and a program unit 12. The summary punch unit includes a hopper 13, for feeding record cards past a first reading brush station or a read-in station 15, a punch station or read-out station 16, second reading brush station or checking station 17, into a stacker 18. The punch unit is employed to read the record cards at the first reading station 15 and feed the factors taken therefrom through a read-in unit 20 and an And unit 21 to the electronic storage units 10 of the calculator unit. Then, while the card is moving between the first reading station 15 and the punch station 16, the program unit 12 controls the transfer of the factors between the storage units 10 and the accumulator unit 11 in a desired sequence, thereby performing the calculations, the results of which may be in either the accumulator unit 11 or the storage units 10, all as described in said Palmer et al. patent. The results may then be read out from the calculator unit through an And unit 22, and a read-out unit 23, to the punches 16 where they are punched in the same record card from which the original factors were read. The card then continues past the second read brushes 17 which are used during checking operations, and then on the stacker 18.

Figure 1:
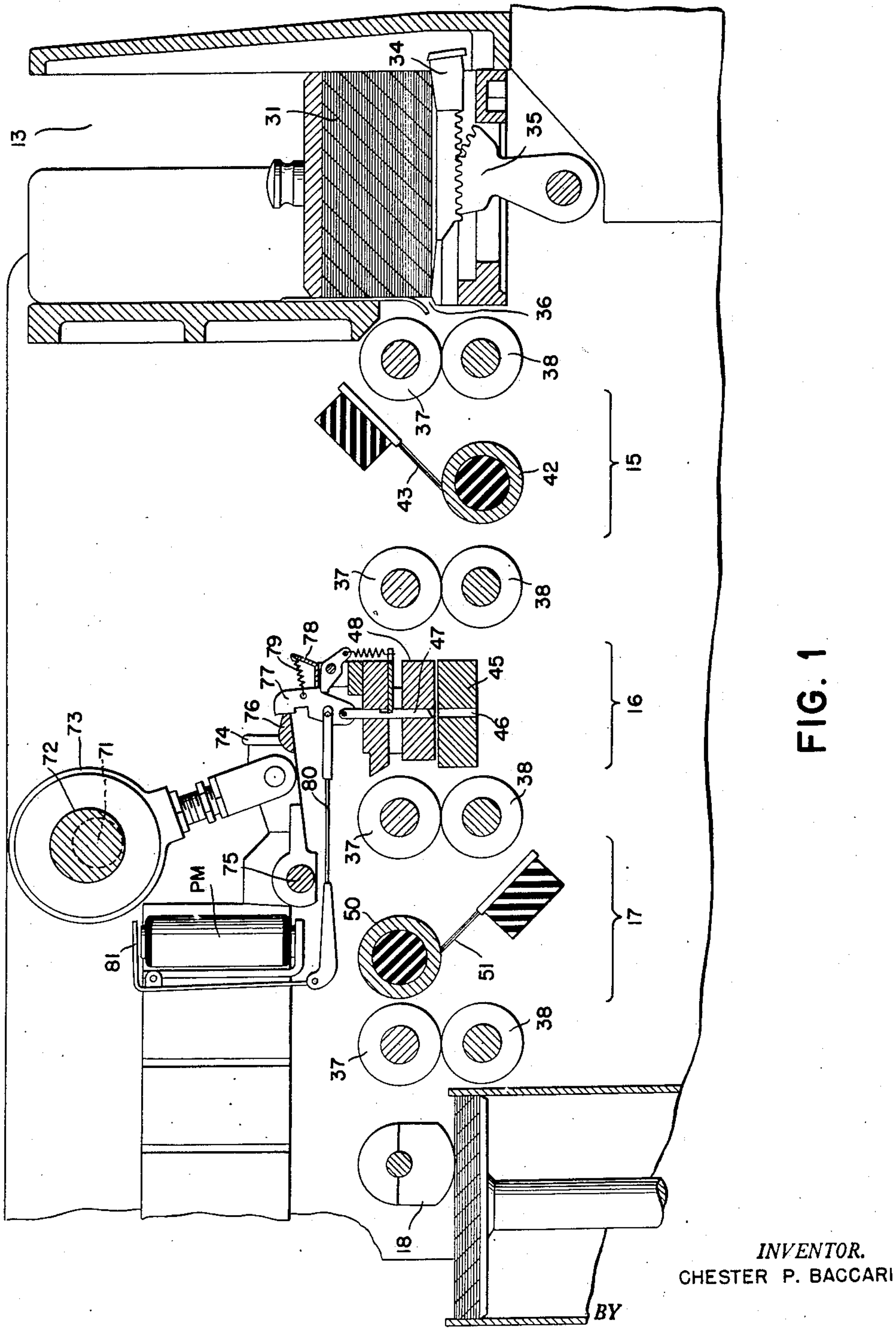
Fig. 1 is a longitudinal section through the punch unit of the calculating machine which embodies the invention.
Figure 2:
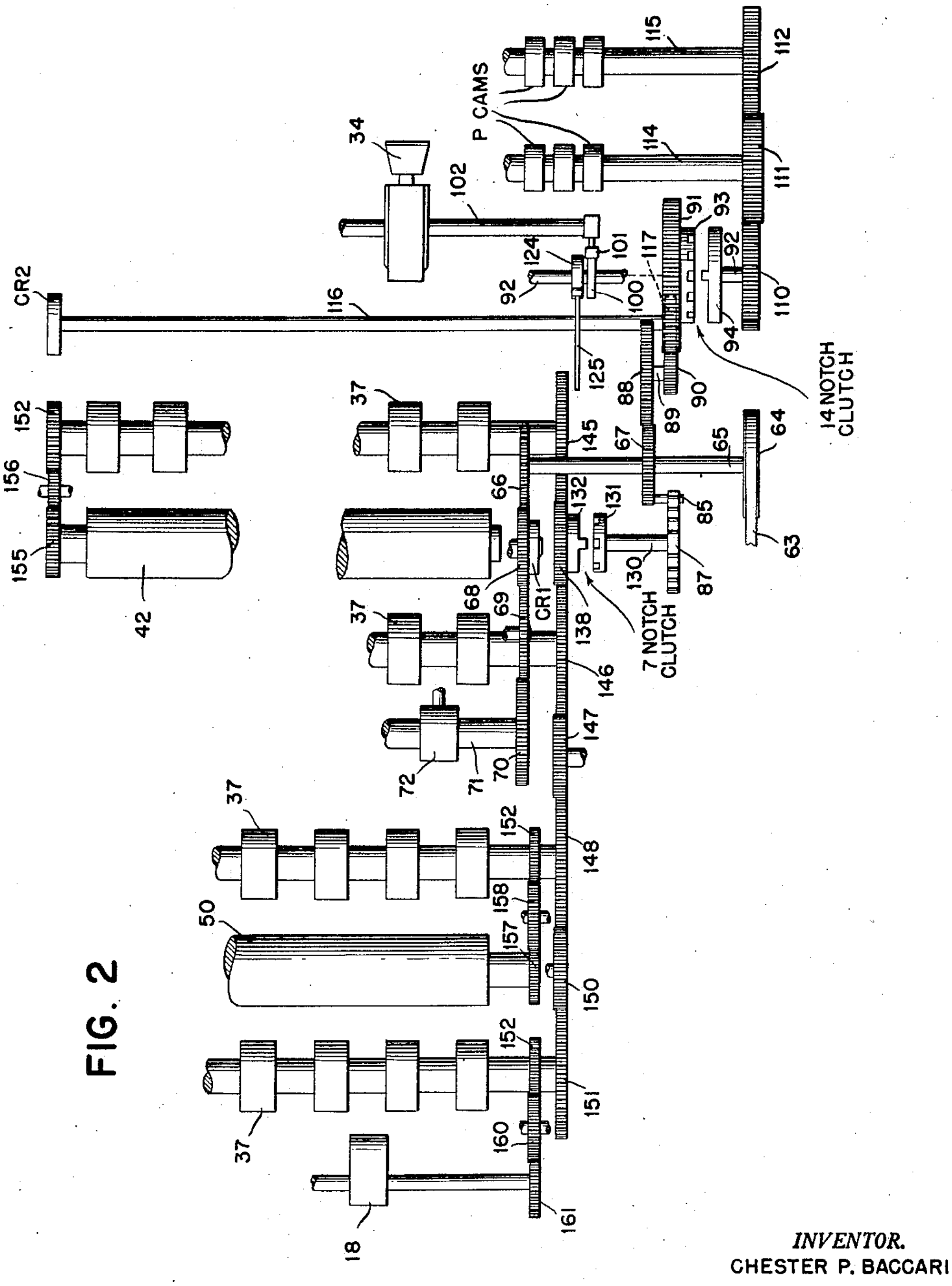
Fig. 2 is a schematic plan view of the punch unit.

Referring to Figs. 1 and 2 in which the summary punch unit is shown in more detail, the hopper 13 (Fig. 1) is adapted to receive a deck of cards 31. When the punch unit is in operation, a picker knife 34, which is reciprocated by a pair of crank sectors, one of which is shown at 35, pushes the bottom card through a throat 36. The card is engaged by a succession of pairs of upper and lower feed rolls 37 and 38 eventually deposited in the stacker 18.

As a card in the punch unit passes the first pair of feed rolls 37 and 38 on its way to the second pair of feed rolls 37 and 38, the card passes between a contact roll 42 and a row of brushes 43 normally bearing on the contact roll. The row of brushes has one brush for each column of the card. This contact roll and row of brushes is identified as the first reading station 15. Between the second and third pairs of feed rolls 37 and 38 is the punch station 16. At this station there is a die 45 with eighty holes 46 aligned with eighty corresponding punches 47 guided in a stripper plate 48. The means for operating the punches will be described presently.

Between the third and fourth pairs of feed rolls 37 and 38 is the second reading station 17 comprising another contact roll 50 and a row of brushes 51.

*Machine timing*

Figure 7:
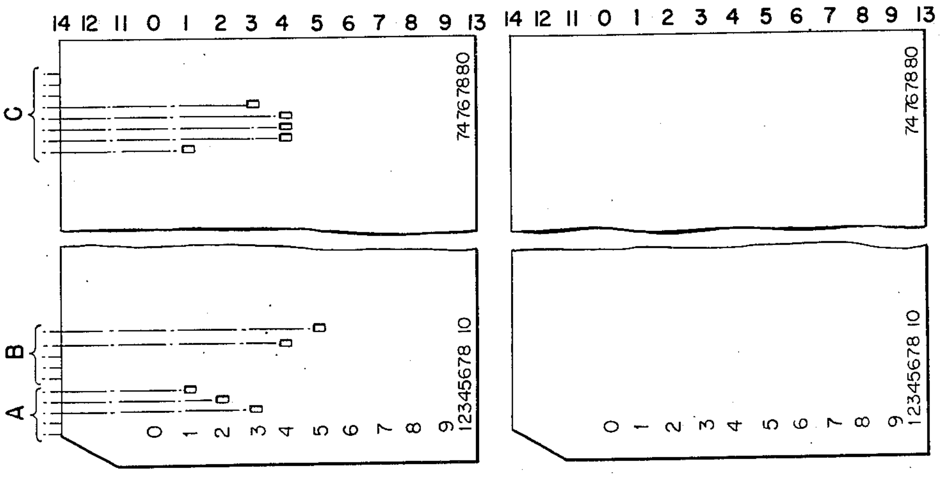
Fig. 7 is a detail view of two record cards showing their relative position while being fed through the punch unit and the location of card index points.

The record cards used are the standard "IBM" punched cards of the 80-column type. The surface of this card, as indicated in Fig. 7, for example, is subdivided into eighty vertical columns and twelve horizontal index rows. The upper two index rows are called the 12 and 11 rows, respectively, and the next ten rows are called 0, 1, 2 . . . 9. A single perforation in any one of the rows 0 to 9 represents a corresponding digit. Fig. 7 indicates a problem $A \times B = C$ where the factor A has been placed in columns 1 to 5, the factor B in columns 6 to 10 and the result C is punched at the punch station in columns 73 to 80.

The cards are fed edgewise, 12 index row first, and in one machine cycle a card is fed the distance between two adjacent reading stations. When the center of the 12 index row of one card is under the punches of the punch station 16, the center of the 12 index row of the following card is under the brushes of the first reading station 15. The center of an index row is called an index point and the distance between index points is called an index. The cards are fed so that the trailing edge of one card is a distance of one index ahead of the leading edge of the next card. When the 12 index row of a card is directly under the first reading station, the machine is considered to be at 12 index point time. As the card moves along, the machine goes through 11, 0, 1, 2, 3, 4, 5, 6, 7, 8, and 9 index point times in that order. When the trailing edge of the card is under the brushes, the machine is at 13 index point time, and when the leading edge of the next card is under the brushes, the machine is at 14 index point time all as indicated in Fig. 7. The time it takes for a card to move from one index point to the next is known as an index time. There are thus fourteen indices between cards and one machine cycle is equal to fourteen index times. Each of the index times is divided into ten parts or teeth for convenience so that 12.1 index point time represents one tooth or one tenth of an index time after 12 index point time.

Referring again to Fig. 6, it can be observed that a cam contact P48, when closed, permits the application of +40 volts through leads 26 to condition the read-in And unit 21 and the read-out And unit 22. Cam contact P48 thus controls both read-in and read-out time.

When a cam contact P6 closes it turns On a Calculate-Start trigger 52 by applying +40 volts via a lead 53 to its right hand input. The Calculate-Start trigger 52 is turned Off by the +40 volts being applied via a cam contact P4 and a lead 55 to its left hand input.

A lead 56 connects the output of the Calculate-Start trigger 52 to the program unit 12 in such a manner as to start the calculation when the Calculate-Start trigger 52 is On, and to end the calculation when this trigger is Off.

Figs. *9a* to *9c* are timing charts showing three cycles of operation of the electronic calculator. Only the operation of those features of the calculator which are necessary for a better understanding of the extended calculate time circuit are plotted on the charts. The charts show the position or condition of all these features during every index time and fraction of an index time, for three cycles, with the first cycle indicating a normal calculate time cycle and the second and third cycles indicating extended calculate time cycles.

Fig. *9a* starts at 14 index point time which is the time that the edge of the first card is under the first reading brush. It can be seen that cam contact P48 does not close until the first card is at one tooth before 11 index point time. As has been previously described, when cam contact P48 closes, it initiates read-in time, and thus read-in time for the first card starts at one tooth before 11 index point time at the left of Fig. *9a*. When cam contact P48 opens at 9.8 index point time, the read-in operation is over.

Next, Fig. *9a* indicates that the Calculate-Start trigger 52 goes On at 13 index point time to start the calculation pertaining to the first card. An unfinished program test is made at 12 index point time in a manner to be described later and assuming the calculation of the first card has ended by then, the test will so indicate. The Calculate-Start trigger 52 will then be turned Off and the time for calculation will end 0.7 index times later at 12.7 index point time.

At 1 tooth before 11 index point time, cam contact P48 closes again, to initiate both the read-out from the accumulator into the first card and the read-in into storage from the second card. This read-time is always constant and cam contact P48 will open at 9.8 index point time to end it.

Calculation of the second card now starts at 13 index point time when the Calculate-Start trigger 52 goes On. An unfinished program test is taken at 12 index point time and in this second cycle, it has been assumed that the machine calculation is not completed at the time of this first test. In this case, the fourteen notch clutch will unlatch at 12.5 index point time and the machine will remain at 12.5 index point time until an unfinished program test tells the machine that the calculation is completed. This 12.5 index point time is known as D time or detent time for a reason to be explained later. Actually at D time, certain mechanisms continue to operate, but for all practical purposes, machine time can be considered as standing still until the calculator units complete the calculation. To enable a description to be given of the mechanisms which do operate during the time the fourteen notch clutch is unlatched, the first index point time after 12 index point time is called index point time *a*. If further delay is necessary, there will be an index point time *b* and index point time *c*, etc., and, for example, if it is desired to refer to a time two teeth after index point time *a*, it will be known as index point time *a*.2.

In Fig. *9b*, at index point time *a*, another unfinished program test is made, and again it will be assumed that the calculation is not complete. The fourteen notch clutch will then remain unlatched and the machine will continue calculating. At each index point, an unfinished program test will be made, and when the calculation is complete, the fourteen notch clutch will latch up at the next half index point which will again be D time. In the example shown for the second card in Fig. *9b*, three complete index times have been added to the complete machine cycle and to calculate-time. At 2 teeth after the second D time or what is again called 12.7 index point time, the Calculate-Start trigger 52 goes Off, to end calculate-time.

Fig. *9c* shows the third card operation and indicates a condition where one full index time has been added to calculate-time.

The detail circuitry for extending calculate-time will be described presently.

*Summary punch unit*

A detailed description will now be given of the summary punch unit which in conjunction with the calculator unit utilizes the invention as a part thereof.

The driving power for the summary punch unit is derived from a continuously running motor M (Fig. 3) and is transmitted through a belt 63 to a pulley 64 (Figs. 2 and 3) fixed to a shaft 65. Also fixed to this shaft are two gears 66 and 67 (Fig. 2). The gear 66 meshes through a train of gears 68 and 69 with a gear 70 secured to a shaft 71 which carries two eccentrics such as 72 (Fig. 1) shaft 71 is, therefore, continuously rotating and makes one complete revolution per index time. The straps 73 (Fig. 1) of these eccentrics 72 are connected to a punch bail 74 pivoted at 75.

Due to the nature of the eccentric, the punch bail descends once each index time, starting its descent at 3 teeth after each index point time and returning to its original position at 8 teeth after each index point time as shown in Figs. *9a* to *9c*. The tongue 76 of the bail 74 stands in front of a row of eighty links 77 connected to the upper ends of respective punches 57. The links 77 are held back against a rest 78 by springs 79 so as to be normally out of the path of the bail tongue 76. The links 77 can be rocked into position to be engaged by the bail, as it descends, by respective call rods 80 operated by related magnet armatures such as 81. The armatures are actuated by corresponding punch magnets such as PM only one of which is fully shown in Fig. 1, some of the others being diagrammatically represented. The punch magnets PM are selectively operated only during the read-out operation.

Figure 3:
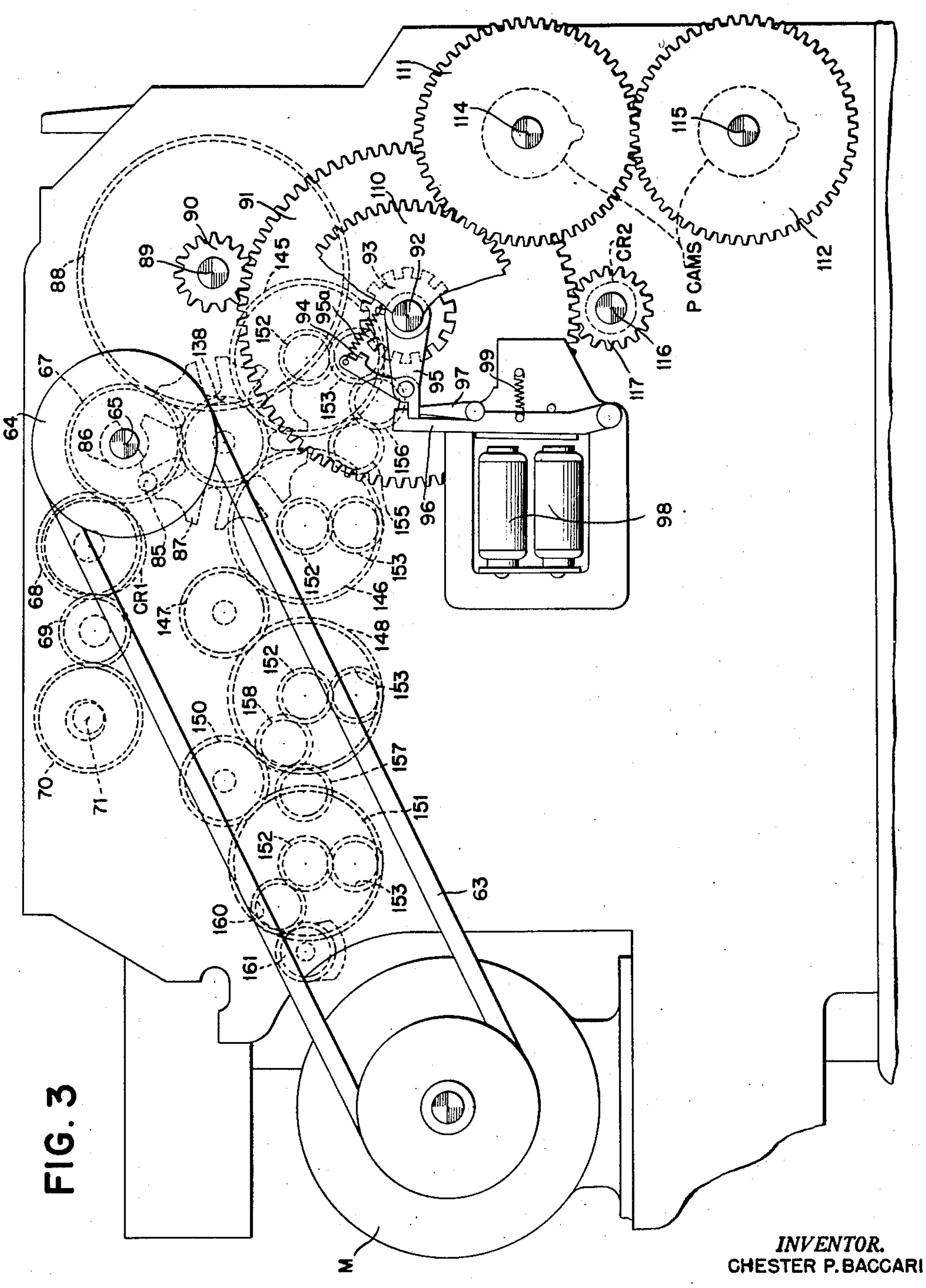
Fig. 3 is a side elevation of the punch unit.
Figures 4, 5:
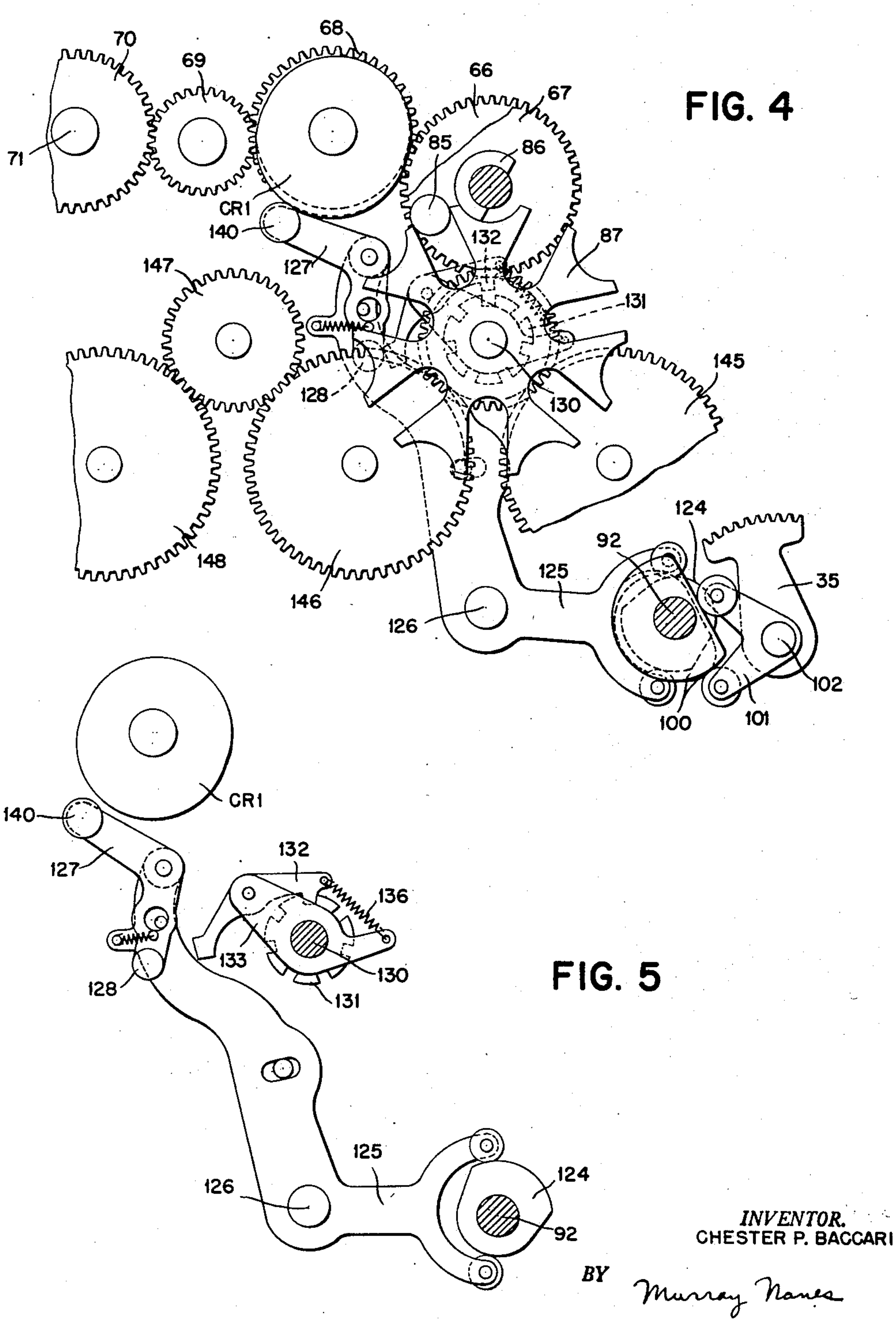
Fig. 4 is a detail view of a part of the punch drive mechanism.
Fig. 5 is a positional view of a part of the mechanism shown in Fig. 4.

The gear 67 (Figs. 2, 3 and 4) has mounted on it a Geneva roller 85 and a Geneva driving gear hub 86 (Figs. 3 and 4). These co-act with a Geneva disc 87, to cause an intermittent motion of the disc with harmonic acceleration and deceleration, the disc being stationary during about two-thirds of the cycle of the gear 67 as described in the Lake patent, Re. 21,133. The continuously intermittent motion is indicated in Figs. *9a* to *9c* where the motion of the Geneva roller 85 into and out of the Geneva disc 87 is shown. The Geneva roller 85 starts to enter the Geneva disc 87 at 8 teeth after each index point time and emerges from the Geneva disc 87 at 1 tooth after each index point time. All during the time the Geneva roller 85 is in the Geneva disc 87, the Geneva disc is being moved and this motion is used to impart an intermittent drive to the feed rolls 37 and 38 and the contact rolls 42 and 50 of the punch unit but only when called for by a seven notch clutch in a manner to be described hereinafter.

The gear 67 meshes with a large gear 88 (Figs. 2 and 3) fixed to a shaft 89, to which is also pinned a small gear 90. The small gear 90 meshes with a large index gear 91 freely mounted on a shaft 92. The shaft 92 is used to impart motion to the picker knives and continuous drive to the P cams, but only when called for by a fourteen notch clutch, in a manner to be now described.

The hub of the continuously rotating index gear 91 has fixed to it a fourteen notch clutch disc 93 (Figs. 2 and 3) which, when the clutch is disengaged, rotates past a clutch detent 94 (Fig. 3). The clutch detent 94 is mounted on an arm 95, fixed to the shaft 92, and is urged by a spring 95*a* toward the clutch disc 93. When the fourteen notch clutch is disengaged, the detent 94 is held away from the disc 93 by its tail, which is caught by a latch 96. The end of the arm 95 is also held by this latch and retained by a keeper 97. The latch 96 can be operated by the energization of a magnet 98 to release the clutch detent 94 and arm 95 and allow the clutch to engage.

When the magnet 98 is energized, the latch 96 is attracted and the tail of the detent 94 is unlatched. The spring 95*a* causes the detent 94 to pivot in a clockwise direction and engage a notch of the fourteen notch disc 93. The index gear 91 is continuously rotating and therefore the fourteen notch disc 93 will continuously rotate. Since the detent 94 is mounted on the arm 95, which is pinned to the shaft 92, when the detent 94 turns with the continuously rotating disc 93, the shaft 92 must also turn. Once the detent 94 is engaged, it must make one complete revolution before it can be disengaged, since there is only latching point, that point being at the predetermined angle at which the latch 96 catches the detent 94. The time at which the detent 94 can engage or disengage the clutch is known as D time as previously mentioned, the D being an abbreviation of detent. Since there is but one latching point, it is necessary to keep the latch 96 attracted by the magnet 98 only long enough to allow the detent 94 to engage the disc 93. When the detent 94 reaches the end of the revolution, the latch 96 has been returned to its normal position by a return spring 99 and if the magnet 98 is not energized at that time to move the latch 96, the tail of the detent 94 strikes the latch 96, causing the detent 94 to be cammed out of mesh with the notch of the disc 93. Each index time later, another notch of the fourteen notch disc 93 will be in position to be engaged by the detent 94 when the magnet 98 becomes energized. The means for energizing the magnet 98 so as to extend the calculate-time of the calculator will be described later.

In Figs. 9*a* to 9*c*, the operation of the fourteen notch clutch for the three problems previously mentioned are shown. In Fig. 9*a*, during the calculation performed on the first card, the fourteen notch clutch remains engaged. In Fig. 9*b*, during second card calculation, the fourteen notch clutch is shown disengaged at the first D time, and becomes engaged again three index times later at the second D time. In Fig. 9*c*, during third card calculation, the fourteen notch clutch is shown as disengaged for one index time.

When the fourteen notch clutch is engaged, the shaft 92 (Figs. 2 and 4) rotates in a clockwise direction. This shaft also has mounted on it a pair of complementary cams 100 (Fig. 4), which operate a cam follower assembly 101 secured to the shaft 102 of the picker knife crank sectors 35. Accordingly, a fixed time after the fourteen notch clutch is engaged, a card will be fed out of the hopper by the picker knives 34.

This can be seen in Figs. 9*a* to 9*c*, where at 3.1 index time the picker knives start moving and by 6.3 index time, the knives begin to move back after leaving the card in a position where it is engaged by the first feed rolls 37, 38. In Fig. 9*a*, while the machine is reading in from the first card, the knives are moving the second card out of the hopper. In Fig. 9*b*, even though the knives start moving at 3.1 index time, it can be observed that the movement of the knives has been delayed three index times after the start of D time. It can thus be understood that when the fourteen notch clutch is disengaged, to extend calculate time, the picker knife action will be delayed.

The shaft 92 (Figs. 2 and 3) which rotates when the fourteen notch clutch is engaged, has fixed to it a gear 110. Gear 110 meshes with a gear 111 which meshes in turn with gear 112. Shafts 114 and 115 are respectively secured to gears 111 and 112. These shafts have secured to them P cams operating the P cam contacts, some of which will be described hereinafter. Because of the direct gearing, as long as the fourteen notch clutch is engaged, the P cams will rotate to perform their function, but as soon as the fourteen notch clutch is disengaged, the P cams stop rotating as indicated in Figs. 9*a* to 9*c*. Thus, it has been shown that when the fourteen notch clutch is disengaged, the picker knife operation is delayed and the P cams are not turned.

There are two continuously running cams labeled CR1 and CR2, which are necessary for the operation of the extended calculate time circuit. Cam CR1 (Figs. 2, 3, 4, and 5) is directly fastened to gear 68 which has previously been described as continuously rotating. A line representing the movement of cam CR1 is shown in Figs. 9*a* to 9*c* as starting to rise at two teeth after each index point, reaching its maximum rise at six teeth after each index point, starting its descent at nine teeth after each index point and back down at each index point. The rise of this line repersents the moving of the high dwell of cam CR1 into the path of a bell crank roller in a manner to be presently described.

Cam CR2 is fastened to a shaft 116 (Figs. 2 and 3), which is in turn fastened to a gear 117, which is in mesh with gear 91 which has been described as continuosly rotating. The rotation of cam CR2 effects the closing of a set of contacts CR2 at each index point, and the opening of those contacts at three teeth after each index point, as represented in Figs. 9*a* to 9*c*. Cam contacts CR2 are used in the unfinished program test to be described later.

A description will now be given of a seven notch clutch, which, as will be shown, controls the operation of the feed and contact rolls, and the stacker.

The shaft 92 has mounted on it a cam 124 (Fig. 5) coacting with a follower 125 in the form of a bell crank lever pivoted at 126. The upper end of the lever 125 has pivotally depending from it a small bell crank lever 127 with a roller 128 which controls the engagement of the seven notch clutch mechanism. At the right hand side of Fig. 9, the line indicating the movement of the lever 125 is shown starting to rise at 9.8 index point time, reaching its maximum rise at 12.5 index point time, starting its descent at 11 index point time and back at its starting position at 11.5 index point time. The rise of this line represents the counter-clockwise rocking of the lever 125. Fig. 4 shows the lever 125 at its starting position and Fig. 5 shows the lever 125 at its maximum counter-clockwise position. Fig. 9*b* shows the lever 125 at its maximum counter-clockwise position at 12.5 index point time, and the broken line indicates that the cam 124 (Fig. 5) on the shaft 92 is not rotating when the fourteen notch clutch is disengaged and so the arm of the lever 125 remains in the maximum counter-clockwise position for three extra index times. Fig. 9*c* shows the lever 125 in the maximum counter-clockwise position for one extra index time.

The previously described Geneva disc 87 is pinned to a shaft 130 (Figs. 2 and 4) to which is also pinned a seven notch disc 131. A clutch dog 132 (Figs. 4 and 5) is pivotally mounted on an arm 133 which is freely mounted on the shaft 130 and is urged by a spring 136

(Fig. 5) toward the seven notch disc 131. The arm 133 and the dog 132 are fixed to a gear 138 (Fig. 2) which is also freely mounted on the shaft 130. When the clutch dog 132 engages the seven notch disc 131, the disc 131 carries the clutch dog 132 around with it. Twice each cycle the tail of the dog 132 is moved into the path of the roller 128. At the right of Fig. 9*a*, the line indicating the movement of the tail of the dog is shown starting to rise at 12.8 index point time, reaching its maximum rise at 11.1 index point time, starting its descent at 11.8 index point time and back down at 0.1 index point time. The rise of this line represents the movement of the tail of the dog 132 into a position where it can contact the roller 128 of the small lever 127.

The Geneva disc has seven slots, while the machine cycle is divided into fourteen cycle points, each cycle point corresponding to the motion of the Geneva disc from one slot to the next. Consequently, the Geneva disc makes two revolutions for each machine cycle and so the seven notch disc 131 will carry the dog 132 around so that its tail will be moved into the path of the roller 128 every half cycle. This can be seen in Fig. 9*a* where the Geneva roller 85 is shown moving between 5.8 and 6.1 index point time at which time it effects a one notch rotation of the seven notch disc 131 to the position where the tail of the dog 132 can contact the roller 128. The line in Fig. 9*a* representing the tail of the dog 132 is thus shown as rising between 5.8 and 6.1 index point time to indicate that the tail of the dog 132 is in the position where it can contact roller 128. At this time, the line representing the position of the lever 125 is down (Fig. 9*a*) indicating that the lever 125 is at its maximum counter-clockwise position (Fig. 5) where the tail of the dog 132 does not contact the roller 128. The seven notch clutch, therefore, remains engaged; the engagement and disengagement of the seven notch clutch being indicated in Figs. 9*a* to 9*c* under the line representing the action of the cam CR1.

Between 12.8 and 11.1 index point times, the Geneva roller 85 is shown moving and effecting a one notch rotation of the seven notch disc 131 to the position where the tail of the dog 132 can contact the roller 128. At 11.1 index point time, when the tail of the dog 132 is in position to contact the roller 128, the lever 125 is shown as still fairly close to its maximum clockwise position. However, the tail of the dog 132 is able to deflect the roller 128, because another roller 140 on the small bell crank 127 does not contact the high dwell of the cam CR1 at this time, as previously described and as indicated in Fig. 9*a*. When the continuously running cam CR1 has its high dwell contacting roller 140, at 11.5 index point time, the lever 125 has rocked to its maximum counter-clockwise position where the tail of the dog does not contact the roller 128 and the seven notch clutch will remain engaged.

In the second cycle (Fig. 9*b*), when the tail of the dog 132 is opposite the roller 128 at 6.1 index time, the lever 125 is again at its maximum clockwise position and remains there until the dog moves away from the roller, and thus the seven notch clutch remains engaged.

One half cycle later, the tail of the dog 132 is opposite the roller 128 at *a*.1 index point time. At this time, the line in Fig. 9*b* representing the lever 125 is up, having remained in its upper position because, since the fourteen notch clutch was disengaged at D time, the cam 124 stopped turning and lever 125 remained in the position it was at D time. The upper position of the line indicates that the lever 125 is at its maximum counter-clockwise position as shown in Fig. 4. At this time, however, the low dwell of the cam CR1 is acting on the roller 140 of the bell crank 127 and the tail of the dog 132 deflects the roller 128.

At *a*.5 index time, the high dwell of cam CR1 is acting on the roller 140 and the bell crank 127 is therefore at its maximum counter-clockwise position. This forces the roller 128 into contact with the tail of the dog 132 and causes the dog to disengage from the notch of the seven notch disc 131. At *a*.8 index time all conditions remain the same, and the Geneva roller 85 acts on the Geneva disc 87 to effect a rotating of the seven notch disc 131, bringing the next notch under the dog 132 at *b*.1 index point time. The dog 132 now slips into the notch because the low dwell of the cam CR1 is acting against roller 140. However, at *b*.5 index point time, the roller 140 of the small bell crank 127 is again being acted on by the high dwell of cam CR1. This rocks the bell crank 127 counter-clockwise and forces roller 128 into contact with the tail of the dog 132 to cause the dog to disengage from the seven notch disc 131. At *b*.8 index point time, the seven notch clutch is still disengaged as the notch on the seven notch disc 131 starts moving away. Thus, it can be seen that even though the dog fell into the notch between *b*.1 index point time and *b*.5 index point time, since the seven notch disc does not start moving until *b*.8 index time, effectively, it can be considered that the seven notch clutch is disengaged during this entire time.

At the second D time, the lever 125 is still counter-clockwise, and the seven notch clutch is again disengaged so that at what is again 12.8 index point time the seven notch clutch rotates one more notch without the dog 132. However, the fourteen notch clutch is now engaged and so at 11 index time the lever 125 begins its counter-clockwise movement. At 11.1 index time when the next notch is under the dog 131, the dog slips into the notch because the low dwell of the cam CR1 is acting against roller 140. Now, at 11.5 index point time, the roller 128 cannot force the dog 131 out of the notch because at this time the lever 125 is at its maximum counter-clockwise position. At 11.8 index point time, the seven notch clutch begins to carry the dog 131 so that its tail is out of the path of the roller 128. Thus, it is now evident that because the fourteen notch clutch was disengaged for three index times, the seven notch clutch also became disengaged for three index times, starting and ending one index time later.

In Fig. 9*c*, the fourteen notch clutch is disengaged for one index time and the seven notch clutch starts its one index time disengagement, one index time after the start of the disengagement of the fourteen notch clutch.

Rotated with the dog 132 when the seven notch clutch is engaged is the gear 138 which is in mesh with a gear 145 (Fig. 2) on the shaft of the first feed roll 37 and a gear 146 on the shaft of the second feed roll 37. The gear 146 has a driving connection, through an idler 147, with a gear 148 on the shaft of the third feed roll 37, and gear 148 meshes in turn through an idler 150 to a gear 151 on the shaft of the fourth feed roll 37. The feed rolls 37 drive their respective counter feed rolls 38 through gears 152 and 153 (Figs. 2 and 3). The first reading brush contact roll 52 is driven by a gear 155 fixed to its shaft, which is driven by an idler 156 in mesh with the gear 153 on the shaft of the first feed roll 37. The second reading brush contact roll 60 is driven by a gear 157 fixed to its shaft, which is driven by an idler 158 in mesh with the gear 152 on the shaft of the third feed roll 37. The stacker roll 18 is driven from the gear 152 on the shaft of the fourth feed roll 37, through an idler 160 and a gear 161 fixed to the shaft of the stacker roll.

The movement of the feed rolls, contact rolls and stacker are shown in Figs. 9*a* to 9*c*, labeled only as feed rolls. Since the gear 138 is not turned when the seven notch clutch is disengaged, the feed rolls, contact rolls and stacker all remain inactive during the time the seven notch clutch is disengaged, as indicated in Figs. 9*b* and 9*c*.

The motion imparted to a card by the feed rolls is a succession of quick movements for the distance from one index row of the card to the next, interspersed with longer dwell times. It is during the dwell times that the punch bail 74 descends and drives any punches engaged with it through the card. Thus, the card can be punched in any index position of any column by energizing the punch magnet PM pertaining to that column at the time when the proper index position of the card is at the die.

It will here be noted that a logical time for the fourteen notch clutch engagement to occur would be at 13.5 index point time which is between cards. However, if this were done, a decision as to whether clutch engagement should occur would have to be made before 13.5 index point time and since calculation starts at 13 index point time, there would be an immediate increase of calculate-time and, therefore, an unnecessary decrease of machine speed. By moving clutch engagement time to 12.5 index point time, two index times of calculation are obtained before a delay determination is made. When the feed rolls are stopped by the disengagement of the seven notch clutch, at one index time after 12.5 index point time, the 11 index row of the card being calculated is already under the punches. The fact that the 12 index row has passed the punches has no effect because the 12 index now is used for controls as described in said Palmer et al. application. A hole in the 12 index position of a column will permit the energization of a control relay which has a holding circuit. This relay will not be deenergized during the calculate delay time and is thus not affected by the delay. The 11 index row may be used for signs or other control information, but the fact that it remains under the punches during increased calculate-time will not affect the operation because read-out to punches cannot occur until calculate-time is over and read-out time begins. When read-out time begins at one tooth before 11 time, the punch bail 74 will descend, starting at 11.3 index point time, to punch any information which must go into the 11 index row.

*Calculator unit*

Fig. 8 shows a block diagram of parts of the calculator unit and the punch unit. In the calculator section at the left of Fig. 8 is shown part of the program unit, the calculate-start circuit and the increased calculate-time circuit. In the punch section at the right of Fig. 8 are shown the clutch magnet 98 and only those cam contacts which are necessary to show the operation of, and to give a clear understanding of, the invention.

Figure 16:
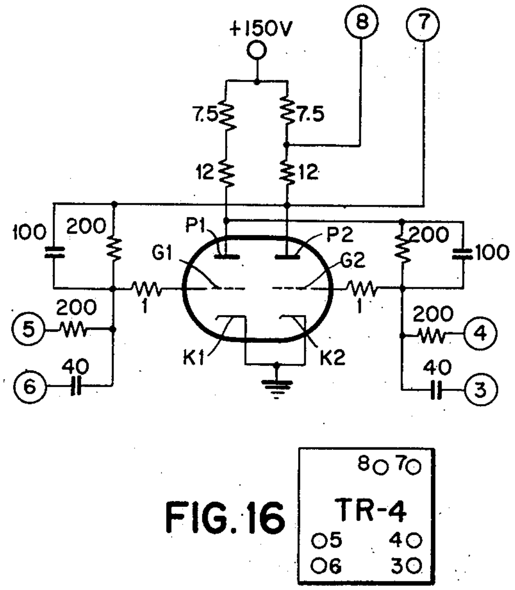
Figure 17:
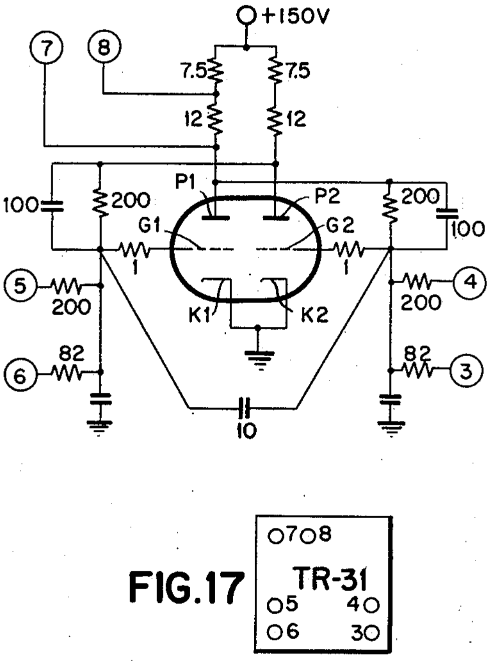

A program ring is illustrated in Fig. 8 to supply to exit hub a series of output voltages, one step at a time, to be used in selecting the order of the arithmetic steps to be performed by the calculator, all as described in said Palmer et al. Patent 2,658,681. Basically, the program ring comprises a ring of electronic triggers of the type generally as shown in the Overbeck Patent 2,404,918, each trigger comprising one step and each trigger being a type TR–4 (Fig. 16). The program ring illustrated consists of 160 program steps (although any number of steps can be used), only one step being On, at any particular time. Upon simultaneous application of a pulse to each of the triggers of the ring, as described in said Overbeck patent, the stage that is On goes Off and, in going Off, flips the next stage On. With each incoming pulse, the ring advances one step.

Figure 15:
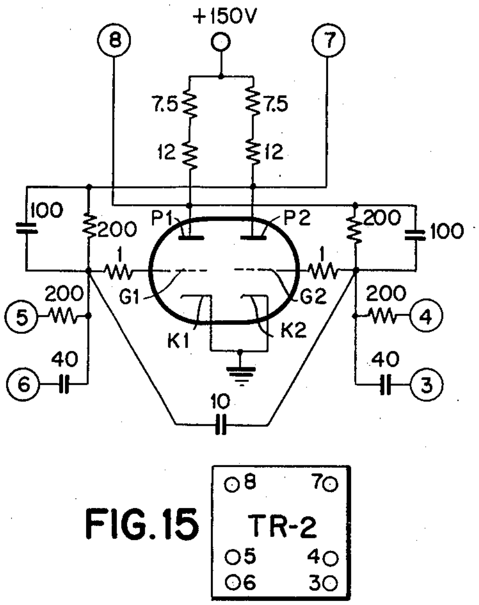

The program ring includes a home position trigger HP and one hundred sixty other triggers. The home position trigger has circuit connections such that it is reset On, before the start of calculation, while all the others are reset Off. Leads connect the tapped output terminals "8" (see also Fig. 16) of each of the triggers to the respective right hand input of the succeeding trigger while a lead 161 connects output terminal "8" of the last program trigger 31, to the right hand input terminal "3" of a Program End trigger 162, which is a type TR–2 (Fig. 15). An input lead 163, supplying negative pulses from a primary timer ring (in a manner to be described herein after) is connected through leads to each of the respective left hand inputs of the program ring triggers.

The first negative input pulse on line 163 acts to turn

Off the home position trigger HP, which, as stated, has been initially reset On, but this pulse does not affect any of the other triggers, since they have all been reset Off. When trigger HP goes Off, its plate P–2 (Fig. 16) goes negative, as previously described, and this negative swing is applied from its output terminal "8" via a lead to the input terminal "3" of the first program ring trigger to thus turn this trigger On. The next pulse on line 163 acts to turn Off the first program ring trigger which thus turns the second program ring trigger On. This stepping process continues until the last program ring trigger goes Off, which via line 161, and the terminal "6" of the Program End trigger 162, turns it Off, thereby ending the program.

Leads connect the output terminals "7" of each of the program ring triggers to inputs of several CF–5 type cathode followers 163. Home position trigger HP is not connected to any cathode followers because no calculation is desired while the home position trigger HP is On. In Fig. 8, only the cathode followers which are connected to the first and second program ring triggers are shown, but it is to be understood that there are cathode followers connected to each of the triggers of the program ring. The outputs of these cathode followers are connected to program exit hubs 165. Three such program exit hubs are provided for each and every program step. They are for the simultaneous control of three sub-program operations of which each arithmetic step may be comprised. These exit hubs, which are connected by external plug-wiring to selected arithmetic step hubs, are thus activated by the program ring.

The program ring has its basic timing controlled by a primary timer ring which, in turn, is advanced from its first position by pulses from a multivibrator, and each time it reaches its second step, it emits a pulse which advances the program ring one step. The primary timer ring, in addition to driving the program open ring, controls circuits by the output from the various triggers of the primary timer ring which develop gating pulses and other pulses for determining the sequence of operation, within a particular program step, all as described in said Palmer et al. patent.

The primary timer ring, as illustrated in Fig. 8, comprises 23 triggers having circuit connection which cause it to operate in the same manner as described for the program ring, except that when the twenty third trigger goes Off, it turns On the first trigger. All the triggers of the primary timer ring are of the type TR–4. A lead 166 connects output terminal "7" of the second primary timer trigger to the input of a PW–2 type power tube 167 whose output is connected to lead 163. Each time the second primary timer trigger goes On a positive pulse is fed through the power tube 167 to lead 163 to advance the program ring one step.

Feeding negative pulses from a multivibrator circuit is an input lead 168 which is connected through leads to each of the respective left hand input of the primary timer ring triggers. The above mentioned input lead 168 for the primary timer ring, is connected to the output terminal of a PS–3 type switch 170 whose grid 2 input terminal "7" is supplied with positive pulses via a lead 171 from a source to be presently described.

A multivibrator of the MV–1 type (Fig. 10) and labeled 172 (Fig. 8) is provided as a source of these pulses. This multivibrator, as previously stated, produces approximately square topped pulses at its output terminal "9." Since this output of the multivibrator is not a true square wave, means are provided to shape the pulses into a square wave. This is done by means of triode clippers, which utilize only a portion of the waveform from the multivibrator to produce perfect square waves, all in a manner described in the above-identified Palmer et al. patent.

The output terminal "9" of multivibrator 172 (Fig. 8) is connected, in parallel, via a lead 173, to two IN–13 type inverters 175 and 176, respectively, having commonly connected input and output terminals. This parallel connection of inverters is known as the first clipper. The output of the first clipper is fed via a lead 177 to a second clipper, which comprises a type IN–36 inverter 178 (see also Fig. 20).

The commonly connected outputs of this second clipper 178 is connected, via lead 180 to a PW–7 type power tube 181 (see also Fig. 13). The second clipper is capacitively coupled (see Fig. 20) to the normally conducting power tube 181. Since such a normally conducting tube will recognize only negative pulses, the power tube 181 will produce a positive output pulse, only when the output of the clipper 178 goes negative. These pulses are fed at the rate of 50 kc. via lead 171 to the grid 2 input terminal "7" of switch 170. Grid 1 input terminal "9" of this switch is connected via a lead 182 to the right hand output terminal "7" of a Calculate trigger 173. When it is desired to start calculating, this Calculate trigger 173 is turned On via a lead 185 by a TR–31 type Calculate-Start trigger 52 which is turned On by cam contact P6 at 13 index time and turned Off by cam contact P4 at 12.7 index time as previously described in conjunction with the description of Fig. 6. The positive voltage which is thus produced at terminal "7" of the Calculate trigger 183 is applied via lead 182 to condition grid 1 of switch 170 and to allow the positive pulses, from lead 171 to pass through switch 171, start advancing the primary timer ring and start calculation. At the end of the calculation, when the last trigger of the program ring goes Off, it applies a pulse via lead 161 to turn On the Program End trigger 162 whose left hand output applies a negative pulse via a lead 186 and a lead 187 to the left hand input of the Calculate trigger 183. This pulse turns Off the Calculate trigger 183, the right hand output of which goes negative, removing the conditioning voltage from switch 170, thus stopping the program ring. Prior to initiation of another calculation, the primary timer and program rings are reset by cams as indicated above.

*The extended calculate-time circuit*

The Program End trigger 162 is connected through the lead 186 and a lead 190 to the left hand input of an &–5 type "And" circuit 191. The right hand input of the "And" circuit 191 is connected through a 270 micro-microfarad condenser and a lead 192, and the normally open contacts of cam CR2 to a −100 volt supply. The terminal of the 270 micro-microfarad condenser, which is furthest from the "And" circuit 191 is connected through a 47K ohm resistor to ground. The combination of the 270 micro-microfarad condenser and the 47K ohm resistor act as a peaker in a manner to be presently described. The output terminal of the "And" circuit 191 is connected through a lead 193, and a bleeder network, consisting of a 330K ohm resistor in series with a 390K ohm resistor, to a source of −175 volts. The 330K ohm resistor is shunted by a 100 micro-microfarad condenser. The mid-point between the bleeder resistors is connected through a 1K ohm resistor to the grid of a thyratron tube 195. The grid of thyratron 195 is connected via a 25 micro-microfarad condenser to the cathode. The cathode is connected through a 4.7K ohm resistor to ground and also through a lead 196 and the fourteen notch clutch magnet 98 to ground. The plate of thyratron 195 is connected through a 0.15K ohm resistor, a lead 197, and the normally open contacts of cam P18 to a source of +75 volts.

Thyratron 195 is a gas filled tetrode, which can be controlled to fire by aplying a high enough positive potential to the grid to reach the ionization point. Once the thyratron is fired, the conduction can be stopped only by opening the plate or cathode circuits, i. e., the grid loses all control after firing.

When the Program End trigger 162 goes On, its left hand output goes negative, and this negative voltage is applied to the left hand input of "And" circuit 191 to condition it. When cam contact CR2 closes at each index point, −100 volts is applied through the peaker network to the right hand input of "And" circuit 191. The peaker network acts like a differentiating circuit to give a sharp initial pulse and a raipd decay. If the left hand input is conditioned and a negative pulse is applied to the right hand input of "And" circuit 191, the output at lead 193 goes positive and this positive potential is applied through the bleeder network to the grid of the thyratron 195. This positive potential will fire the thyratron if the normally open cam contacts P18 in the plate circuit of the thyratron are closed.

The input terminal "4" of Program End trigger 162 is connected via a lead 198, and the normally closed contacts of P57 to a source of −100 volts. When contacts P57 open, the −100 volts are removed from the right hand grid of the TR–2 type Program End trigger 162 causing the right hand grid to go positive and reset that trigger Off. Fig. 9*a* shows that cam contact P57 opens at 9.2 index point time to reset the Program End trigger 162 Off. Calculation begins at 13 index point time, and as has previously been indicated, the problem in the first card is assumed to be a short one, so that the Program End trigger 162 goes On before 12 index point time to condition "And" circuit 191. Cam contacts P18 close at one tooth before 12 index point time to complete the plate circuit of thyratron 195, so that when cam contacts CR2 close to make the unfinished program test a 12 index point time, a pulse is sent through the conditioned "And" circuit 191 to fire thyratron 195 and energize the fourteen notch clutch magnet 98. Since the latch 96 can not disengage the detent 94 from the fourteen notch disc 93 until 12.5 index point time, the energization of the magnet, starting at 12 index point time, will pull the latch 96 out of the path of the detent 94 and allow the detent 94 to remain engaged to start another cycle without delay.

At 12.8 index point time, cam contacts P18 open. Thus, although Program End trigger 162 remains On until 9.2 index point time of the next cycle, unfinished program cam shots via the cam CR2 contacts will pass through the conditioned "And" circuit 191, but the thyratron 195 will not fire because its plate circuit is open.

In Fig. 9*b*, cam contact P57 opens at 9.2 index point time to reset the Program End trigger 162 Off. As previously indicated, the problem in the second card is assumed to be a long one, so that the Program End trigger 162 is still Off at 12 index point time and the "And" circuit 191 remains unconditioned. When cam contacts CR2 close at 12 index point time, the cam shot cannot pass through the unconditioned "And" circuit 191 to fire thyratron 195 and the fourteen notch clutch magnet 98 remains unenergized. The latch 96 remains in the path of detent 94, and at 12.5 index point time, the latch 96 causes the detent 94 to disengage from the fourteen notch disc 93 to stop machine functions as previously described and effect increased calculate-time. At *a* and *b* index point time, the Program End trigger 162 is still Off, and the CR2 cam shots will not fire the thyratron 195, and so the fourteen notch clutch remains disengaged. As previously indicated, the problem on the second card ends after three index times have been added to the calculate-time. It is thus assumed that the Program End trigger 162 goes On just before *c* index point time, and therefore, the CR2 cam shot at *c* index point time will pass through the conditioned "And" circuit 191 and fire the thyratron 195 to release the latch 96. Then one half an index time later, at 12.5 index point time, a notch of the fourteen notch disc 93 will have rotated to the position where the detent 94 can slip in, and the fourteen notch clutch is again engaged, stating some of the machine functions. One index time later when the seven notch clutch is reengaged, completely normal operation is resumed.

The operation of the third cycle (Fig. 9c) is similar to that just described for the second cycle, except that there is a delay of only one index time instead of a three index time delay.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a record controlled calculator, a calculating unit including means to store factors, means to carry out mathematical operations with factors stored in said factor storage means, means to program said operations and accumulator means to store the results of said operations, a cyclically operating record reading machine comprising a read-in and a read-out station, means at the read-in station for reading factors from a record into said factor storage means, and means at the read-out station for reading results from said accumulator means into said record, means for moving the records sequentially through the read-in and the read-out stations respectively, means operable during the time of movement of a record between said read-in and read-out stations for activating said calculating unit program means to start calculating of said record, said time of movement between stations being the original calculate-time, program end means for indicating a finished program, testing means for periodically testing said program end means during the movement between said stations without stopping said calculating, and means responsive to a test by said testing means indicating an unfinished program, for increasing the original calculate-time by delaying the moving of said record into the read-out station until the calculating program is finished, said record reading machine automatically moving records again after said test indicates that the calculating program is finished.

2. In a record controlled calculator as in claim 1, wherein said means for moving the records through the read-in and read-out stations includes clutch means which are disengaged when delaying the moving of records.

3. In a record controlled calculator as in claim 2, wherein said records have uniformly spaced index points at each of which one order of a factor or result may be located, said moving means moving said records through the stations in step of index point intervals, and said clutch means operable to be re-engaged so as to end the delay in time units corresponding to index point intervals when the calculating program is finished.

4. In a record controlled calculator as in claim 3, including a continuously rotating driving means, said clutch comprising a pawl and a disc having a plurality of notches, said notches adapted to engage said pawl, means connecting said pawl to said moving means, and means connecting said disc to said driving means, said pawl when disengaged from a notch of the disc remaining stationary to stop the moving means, said pawl operable to be selectively re-engaged by the disc notch rotated past said pawl.

5. In a record controlled calculation as in claim 3, wherein said testing means includes a testing circuit, contacts to complete said circuit when closed, and a continuously rotating cam to close said contacts once each index point to continue the testing even when the reading of the records is delayed.

6. In a record controlled calculator as in claim 3, including a magnet operable for controlling said clutch, and a circuit including a thyratron which when fired, operates said magnet.

7. In a record controlled calculator as in claim 5, including contacts operable when closed for conditioning said thyratron circuit for firing, a rotating cam operable to close said contacts at the end of original calculate-time, said cam rotation being stopped by said clutch means during delay time to keep said thyratron in a condition to be fired until the calculation is complete.

8. In a record controlled calculator as in claim 6, said program end means including a program end trigger, said testing means including a testing circuit, a contact to complete said circuit when closed, a continuously rotating cam to close said contacts once each index point, and a gating means jointly controlled by said program end trigger and said testing circuit for firing said thyratron.

9. In a record controlled calculator, a calculating unit including means to store factors, means to carry out mathematical operations with factors stored in said factor storage means, means to program said operations, and accumulator means to store the results of said operations, a summary punch unit including a reading station for reading factors from said record into said factor storage means, and a punch station for punching results from said accumulator means into said record, a continuously rotating driving means, a card picker mechanism operated under control of said driving means for feeding records to said reading station, said record having uniformly spaced index points at each of which one order of a factor or result may be located, a Geneva gear operated by said driving means, card feeding rollers operated under control of said Geneva gear for feeding the record through the stations in steps of index point intervals, means operable during the time of movement of said record between said reading station and said punching station for activating said calculating unit program means to start calculating, a first clutch between said card picker mechanism and said driving means, means including a magnet operable to engage said clutch, means operable for energizing said magnet, a second clutch between said Geneva gear and said feed rollers, a releasing means for operating the second clutch under control of the first clutch, program end means for conditioning said energizing means when a finished program is indicated, pulsing means effective at each interval representative of the time for the record to move from one index point to the next index point for operating said conditioned energizing means to delay in units of index time intervals, the movement of said records through said punching station until the calculating program is finished.

10. In a record controlled calculator as in claim 9, wherein said first clutch comprises a pawl and a disc having a plurality of notches, said notches adapted to engage said pawl, means connecting said pawl to said card picker mechanism, means connecting said disc to said driving means, said pawl when disengaged from a notch of the disc remaining stationary to stop the card picker mechanism, said pawl operable to be selectively re-engaged by the disc notch rotated past said pawl, said second clutch comprising a second pawl and a second disc having a plurality of notches, said notches adapted to engage said second pawl, means connecting said second pawl to said feed roller, and means connecting said second disc to said Geneva gear, said second pawl when disengaged from a notch of the second disc remaining stationary to stop the feed rollers, said second pawl operable to be selectively re-engaged by the second disc notch rotated past said second pawl.

11. In a record controlled calculator, a calculating unit including means to store factors, means to carry out mathematical operations with factors stored in said factor storage means, means to program said operations and accumulator means to store the results of said operations, a cyclically operating record reading machine, including means operable during one portion of the cycle of said machine for reading factors into said factor storage means and for reading results out of said accumulator means, and means operable in a second portion of the cycle thereof for activating said calculating unit program means to start calculating, program end means for indicating a finished program, testing means for periodically testing said program end means during said second portion of the cycle without stopping said calculating, and means responsive to a test by said testing means indicating an unfinished program, for delaying the reading of records by said record reading machine until the calculating program is finished, said record reading machine automatically reading records again after said test indicates that the calculating program is finished.

12. In a record controlled calculator as in claim 11, includes clutch means which are disengaged when delaying the reading of records.

13. In a record controlled calculator as in claim 12, wherein said records have uniformly spaced index points at each of which, one order of a factor or result may be located, said delaying means delaying the reading of records in steps of index point intervals, and said clutch means operable to be re-engaged so as to end the delay in time units corresponding to index point intervals when the calculating program is finished.

14. In a record controlled calculator as in claim 13, wherein said testing means includes a testing circuit, a contact to complete said circuit when closed, and a continuously rotating cam to close said contacts once each index point to continue the testing even when the reading of the records is delayed.

15. In a record controlled calculator as in claim 13, including a magnet operable for controlling said clutch, and a circuit including a thyratron which when fired operates said magnet.

16. In a record controlled calculator as in claim 15, said program end means including a program end trigger, said testing means including a testing circuit, a contact to complete said circuit when closed, a continuously rotating cam to close said contacts once each index point, and a gating means jointly controlled by said program end trigger and said testing circuit for firing said thyratron.

17. In a record controlled calculator, a calculating unit including means to store factors, means to carry out mathematical operations with factors stored in said factor storage means, means to program said operations, and accumulator means to store the results of said operations, a summary punch unit including means at a reading station for reading factors from a record into said factor storage means, and means at a punch station for punching results from said accumulator means into said record, a driving means, a card picker mechanism operated under control of said driving means for feeding records to said reading station, said record having uniformly spaced index points at each of which one order of a factor or result may be located, a Geneva gear operated by said driving means, card feeding rollers operated under control of said Geneva gear for moving the record through said stations in steps of index point intervals, means operable during the time of movement of said record between said reading station and said punching station for activating said calculating unit program means to start calculating, a first clutch including a disc continuously rotated by said driving means, said disc having a plurality of notches, means including a pawl operatively connected for operating said card picker mechanism when said pawl engages a notch of said disc, said pawl rotating with said disc, a second clutch between said Geneva gear and said feed rollers, a releasing means for operating the second clutch under control of the first clutch, latch means selectively operable for disengaging said pawl from a notch on the disc, said pawl operable to be selectively re-engaged by the disc notch rotated past said pawl, a magnet which when energized holds said latch means out of the path of said pawl to prevent disengagement, a thyratron circuit for energizing said magnet when fired, a gating means operable for firing said thyratron, program end means for conditioning said gating means when a finished program is indicated, pulsing means effective at each interval representative of the time for the record to move from one index point to the next index point for operating said conditioned gating means to fire said thyratron, said gating means if not conditioned effecting a delay, in units of index time intervals of the movement of said records through said punching station until the calculating program is finished.

No references cited.